(12) United States Patent
Andersson et al.

(10) Patent No.: US 12,481,527 B2
(45) Date of Patent: Nov. 25, 2025

(54) RESOURCE TEAMING OPTIMIZATION FOR RESOURCE PLANNING

(71) Applicant: THE BOEING COMPANY, Chicago, IL (US)

(72) Inventors: Martin Andersson, Jonsered (SE); Fredrik Altenstedt, Mölndal (SE); Lennart Bengtsson, Gothenburg (SE); Dmitrii Sergejev, Mölndal (SE); Waldemar Kocjan, Gothenburg (SE); Christoffer Sandberg, Gothenburg (SE); Henrik Roos, Mölndal (SE); Björn Carlsson, Gothenburg (SE)

(73) Assignee: The Boeing Company, Chicago, IL (US)

( * ) Notice: Subject to any disclaimer, the term of this patent is extended or adjusted under 35 U.S.C. 154(b) by 649 days.

(21) Appl. No.: 17/709,859

(22) Filed: Mar. 31, 2022

(65) Prior Publication Data

US 2022/0318055 A1 Oct. 6, 2022

Related U.S. Application Data

(60) Provisional application No. 63/169,639, filed on Apr. 1, 2021.

(51) Int. Cl.
*G06F 9/48* (2006.01)
*G06F 9/50* (2006.01)
(Continued)

(52) U.S. Cl.
CPC .......... *G06F 9/4881* (2013.01); *G06F 9/5038* (2013.01); *G06F 9/505* (2013.01); *G08G 5/30* (2025.01)

(58) Field of Classification Search
CPC ...... G06F 9/5038; G06F 9/505; G06F 9/4881; G08G 5/003; G06Q 10/06315; G06Q 10/06311
See application file for complete search history.

(56) References Cited

U.S. PATENT DOCUMENTS

| | | | |
|---|---|---|---|
| 2005/0114829 A1* | 5/2005 | Robin | G06Q 10/06 717/101 |
| 2009/0043621 A1* | 2/2009 | Kershaw | G06Q 10/06398 705/7.17 |

(Continued)

OTHER PUBLICATIONS

Yogesh Dashora et al., "4—Reducing Crew Split in Multi-rank Pairing Optimization Problems," Session TB51—Joint Session AAS/TSL Air/Practice Curated: Airline Scheduling, dated Oct. 22, 2019 [Abstract Only].

(Continued)

*Primary Examiner* — Kenneth Tang
(74) *Attorney, Agent, or Firm* — Yee & Associates, P.C.

(57) ABSTRACT

Resource teaming optimization for resource planning is provided by identifying a set of tasks, wherein each task of the set of tasks includes a plurality of subtasks that includes an initial subtask starting at a given state and a final subtask returning to the given state; identifying resource requirements for each subtasks of the plurality of subtasks; dividing a set of resources into a plurality of candidate slices to meet resource requirements for the plurality of subtasks; forming a plurality of combinations from the plurality of candidate slices to satisfy the resource requirements; identifying a given combination from the plurality of combinations having a highest teaming metric across the set of tasks; and assigning the given combination for the set of tasks.

20 Claims, 17 Drawing Sheets

(51) Int. Cl.
    *G08G 5/30*           (2025.01)
    *G08G 5/00*           (2025.01)

(56) References Cited

U.S. PATENT DOCUMENTS

| | | | | |
|---|---|---|---|---|
| 2010/0082383 | A1* | 4/2010 | Pachon | G06Q 10/06 705/7.13 |
| 2014/0019033 | A1* | 1/2014 | Berge | G08G 5/56 701/120 |
| 2014/0142998 | A1* | 5/2014 | Kroeger | G06Q 10/06311 705/7.13 |
| 2014/0257900 | A1* | 9/2014 | Jacobs | G06Q 10/063116 705/7.16 |
| 2016/0034841 | A1* | 2/2016 | Matula | G06Q 10/063112 705/7.14 |
| 2016/0335583 | A1* | 11/2016 | Suntinger | G06Q 10/063114 |
| 2016/0335584 | A1* | 11/2016 | Woicekowski | G06Q 10/063112 |
| 2017/0011637 | A1* | 1/2017 | Woicekowski | G06Q 10/109 |
| 2017/0116552 | A1* | 4/2017 | Deodhar | G06Q 10/0639 |
| 2018/0247273 | A1* | 8/2018 | Tamma | G06Q 10/1095 |
| 2020/0126020 | A1* | 4/2020 | Nicolaisen | G06Q 10/1053 |
| 2021/0019179 | A1* | 1/2021 | Yadav | G06F 9/5038 |

OTHER PUBLICATIONS

Lennart Bengtsson et al., "Railway Crew Pairing Optimization," Carmen Systems, Year 2007, pp. 1-20.

Niklas Kohl et al., "Airline Crew Rostering: Problem Types, Modeling, and Optimization," Annals of Operations Research, Kluwer Academic Publishers, vol. 127, No. 1-4, Dated: Mar. 1, 2004, pp. 223-257.

European Patent Office, Extended European Search Report for Application 22166187.9-1203 dated Jul. 21, 2022.

* cited by examiner

RESOURCE TEAMING OPTIMIZATION FOR RESOURCE PLANNING

CROSS-REFERENCE TO RELATED APPLICATIONS

This application claims benefit of and priority to U.S. Provisional Patent Application Ser. No. 63/169,639, which is hereby incorporated in its entirety.

FIELD

Aspects of the present disclosure relate to improving computational speed and efficiency in identifying solutions to combinatorial problems in which resources to perform a task are preferentially kept as part of a coordinated team of resources across several subtasks.

BACKGROUND

Combinatorial problems involve finding a grouping, ordering, or assignment of a discrete, finite set of objects that satisfies a given set of conditions. In combinatorial problems, exhaustive search for an optimal solution is generally not tractable.

Resource planning is a type of combinatorial problem for which optimization techniques remains elusive. For example, when presented with a number of tasks and a set of resources to complete those tasks, handling the assignment of resources to tasks can be subject to exponential increases in complexity as the number of tasks and resources increase and/or as the rules or constraints for how to assign those resources to tasks increase. Identifying one or more solutions that "best" assign resources to tasks according to the rules can use significant computing resources and/or significant amounts of time. These assignments can be further complicated by the desire to not only efficiently assign individual resources to a task, but to use resources in groups or teams across several subtasks across a given task.

SUMMARY

The present disclosure provides a method in one aspect, the method including: identifying a set of tasks, wherein each task of the set of tasks includes a plurality of subtasks that includes an initial subtask starting at a given state and a final subtask returning to the given state; identifying resource requirements for each subtasks of the plurality of subtasks; dividing a set of resources into a plurality of candidate slices to meet resource requirements for the plurality of subtasks; forming a plurality of combinations from the plurality of candidate slices to satisfy the resource requirements; identifying a given combination from the plurality of combinations having a highest teaming metric across the set of tasks; and assigning the given combination for the set of tasks.

In one aspect, in combination with any example method above or below, the teaming metric is configured to prioritize combinations that result in a higher number of tasks in the set of tasks exhibiting whole-task teaming over combinations that result in a lower numbers of tasks exhibiting whole-task teaming.

In one aspect, in combination with any example method above or below, the teaming metric is configured to penalize combinations in which a given resource assigned to the task of the set of tasks is not associated with the given state.

In one aspect, in combination with any example method above or below, the set of resources is divided into at least a first class of candidate slices and a second class of candidate slices, further comprising: evaluating the first class of candidate slices and the second class of candidate slices against the teaming metric separately from one another.

In one aspect, in combination with any example method above or below, a number of candidate slices for a given task is set less than an exhaustive number of candidate slices for the given task when the exhaustive number exceeds a threshold number.

In one aspect, in combination with any example method above or below, the method further includes: selecting up to the threshold number of candidate slices from an exhaustive set of candidate slices to include: a priority-based subset of candidate slices from the exhaustive set of candidate slices.

In one aspect, in combination with any example method above or below a given task of the set of tasks includes associated subtasks that span a rest period that is considered teamed for all resources.

In one aspect, in combination with any example method above or below the method further includes: generating the plurality of combinations according to a set of assignment rules for the resources.

In one aspect, in combination with any example method above or below, a first task of the set of tasks is associated with a first state as the given state; first resources assigned to the first task are associated with the first state; a second task of the set of tasks is associated with a second state as the given state that is different from the first state; and second resources assigned to the second task are associated with the second state.

In one aspect, in combination with any example method above or below, the set of tasks are flight trips; the plurality of subtasks are flight legs; the given state designates an airport; the resources identify crew postings to the flight legs; and the teaming metric is configured to optimize whole-task teaming across the set of tasks.

The present disclosure provides a system in one aspect, the system including: a memory storing computer-executable instructions; and a processor configured to execute the computer-executable instructions and cause the system to perform a method in accordance with any of the methods described above.

The present disclosure provides a non-transitory computer-readable medium in one aspect, the non-transitory computer-readable medium including computer-executable instructions that, when executed by a processor of a computing system, cause the computing system to perform a method in accordance with any of the methods described above.

The present disclosure provides a computer program product embodied on a computer readable storage medium in one aspect, the computer program product including code for performing a method in accordance with any of the methods described above.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure provides a teaming optimizer with improved computational speed and efficiency in identifying resource-to-task assignments that keep coordinated teams of resources together through multiple sub-operations of the tasks, where feasible. The teaming optimizer described herein follows various rules so that potential solutions that violate the rules are excluded, and various other prioritization schemes can be combined with a teaming preference prioritization scheme. Beneficially, the described teaming optimizer is able to arrive at the best assignments faster and more reliably and using fewer computing resources (e.g., less memory, lower power, fewer clock cycles, etc.) to thereby improve the functionality of the computing devices used in analyzing resource-to-task assignments.

Although the examples given in the present disclosure generally relate to the assignment of crew postings (as the resources) to flight trips (as the tasks) made of several individual flight legs (as the subtasks), which can later be filled according to seniority rules, training/certification, flight routes, team prioritization, etc. (as the rule set) for individual crew members, the present disclosure can be applied in various fields.

In a first example, the teaming optimizer can assign postings for cores (individual resources) of computer processors (as the potential teams) to handle individual threads (as the subtasks) of a processing load (as the tasks) based on a thread priority from a set of programs (as the rule set). In a second example, the teaming optimizer can assign diversion channels (as the resources) associated with a given levy or dam (as a potential team) to handle floodwater overflow (as the task) at various portions of a river (as subtasks) based on soil saturation levels, development profiles, and road/bridge presence (as the rule set). In a third example, the teaming optimizer can assign various postings trains, ships, or trucks (as the resource) to handle cargo containers for individual delivery (as the subtasks) along delivery routes (as the tasks), according to shipping routes, delivery schedules, and temperature requirements (as the rule set). As will be appreciated, the described teaming optimizer can be applied in a variety of technical fields that are contemplated by the present disclosure.

Figure 1A:
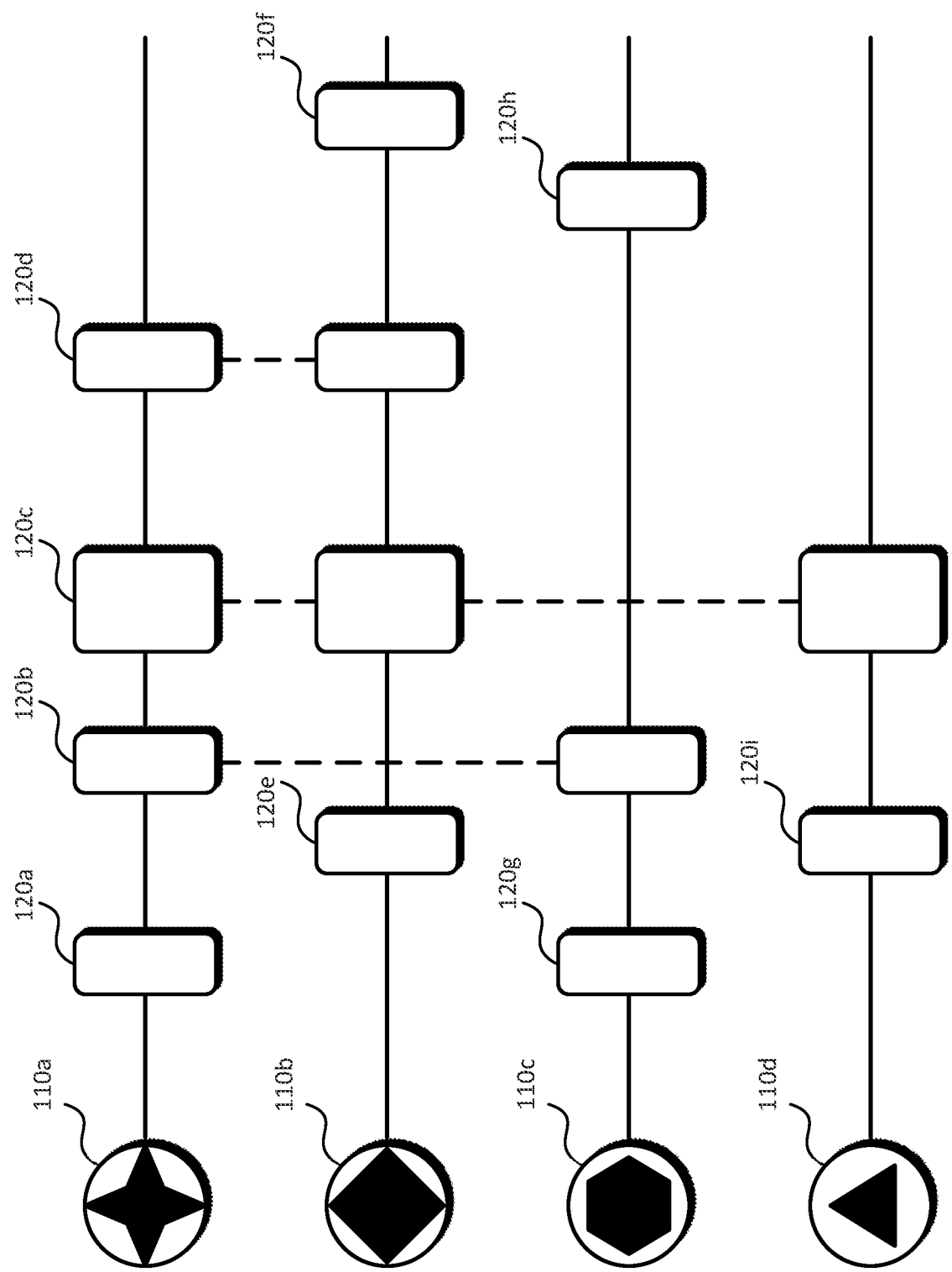
FIGS. 1A-1B illustrate a problem-space for teaming optimization, according to aspects of the present disclosure.
Figure 1B:
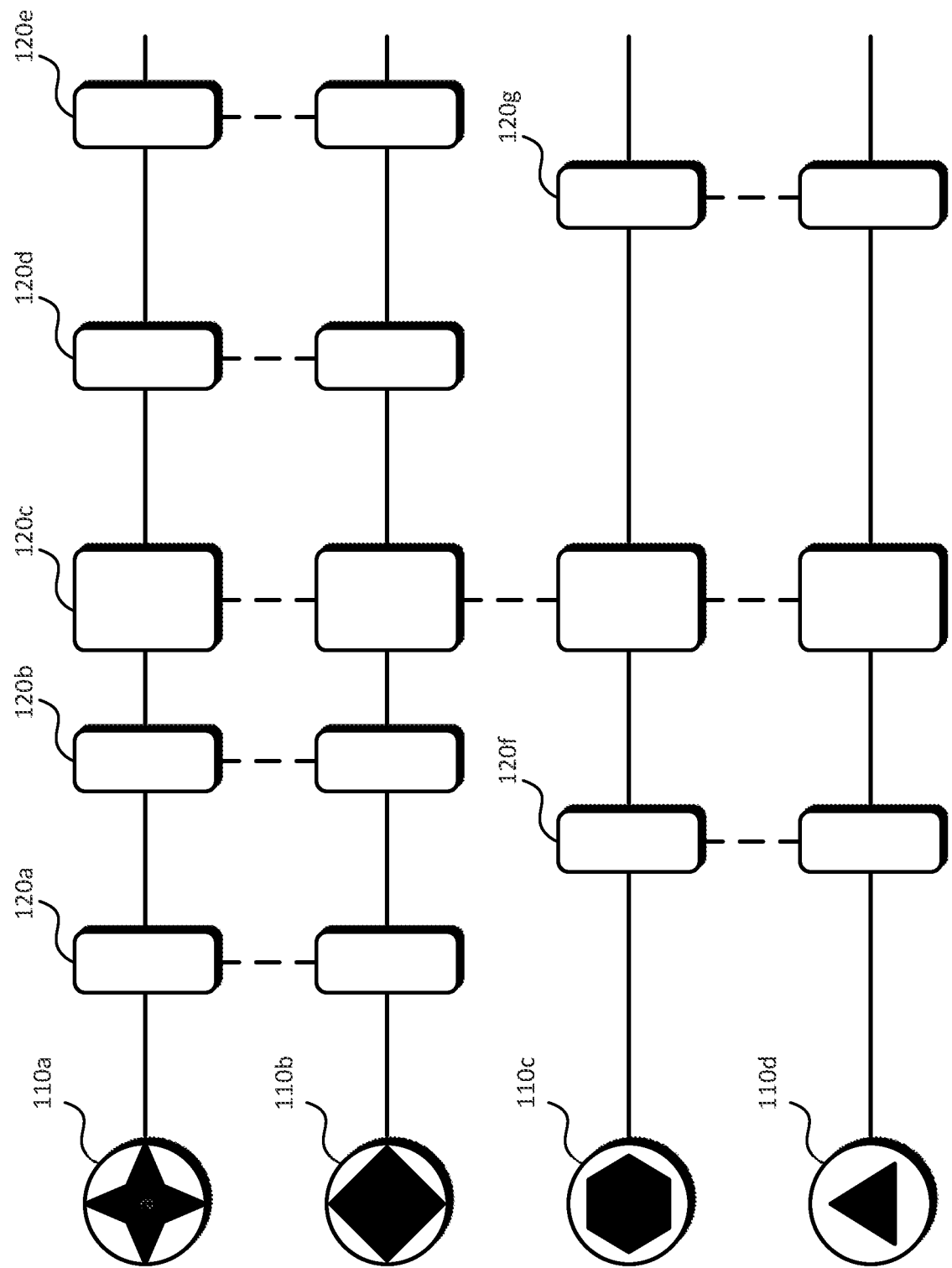

FIGS. 1A-1B illustrate a problem-space for teaming optimization, according to aspects of the present disclosure. When scheduling tasks and assigning resources for completing those tasks, the tasks can often be divided into subtasks that are completed by different resources at different times. For example, an airline scheduler can define a trip as a task, which is divided into a series of subtasks describing each leg of the trip. Each leg describes one source and one destination (e.g., departing from airport A, arriving at airport B), and the trip describes a route that departs from and returns to the same base (e.g., departing from airport A, visiting airports B-Z, and arriving back at airport A). In the current example, the various schedules for crew postings assigned to the legs are the resources, and may include various roles (e.g., captain, first officer, navigator, purser, flight attendant, etc.) that each crewmember is qualified for or adapted to perform (e.g., certification on a given aircraft).

Although a scheduler can assign individual resources to subtasks, a scheduler can also attempt to assign teams of two or more of the resources across the subtasks of a task. The teaming operation can add complexity to the assignment analysis and optimization, but can result in several benefits. For example, by teaming crewmembers together across a trip (or several legs of a trip) via teamed postings, scheduling delays can evenly effect the entire crew, thus avoiding mismatched duty cycles for the crew. In another example, by teaming various generators and batteries in a power plant across a power production cycle, wear and tear on the various components can be better tracked for even distribution. In a further example, by scheduling and teaming cores of a set of processors together across a distributed computing process (or several sub-functions of a process), interrupts may have a reduced effect on processing time and the processor may experience a more even heating/cooling cycle. Other benefits of task teaming will become apparent through further review of the present disclosure.

In FIG. 1A, several duty charts 110a-d (generally or collectively, duty charts 110) for individual resources assigned to different subtasks 120a-i (generally or collectively, subtasks 120) are shown with various levels of teaming. The duty charts 110 show a time series of a duty period for an associated resource, and when that associated resource is assigned to a given subtask 120. As will be appreciated, the designations of "first," "second," "third," etc., are provided to distinguish the various elements from one another, and do not necessarily indicate a time-based order of assignment or occurrence of the elements.

A single duty chart corresponds to the scheduled subtasks for a given resource over a period of time, and a resource can only be scheduled for one subtask at a time. When considered in aggregate, combined duty charts indicated how several resources are assigned to different aspects of a series of tasks and subtasks, indicating whether the resources remain part of group or team over some or all of the task. Additionally, a collection of duty charts is understood to illustrate when subtasks are scheduled to be performed by a collection of resources in conjunction with one another. Accordingly, various delays, cancellations, or reassignments of subtasks can affect when a given resource performs an associated subtask. However, by assigning the resources in teams, the effects of the changes to the schedule can be mitigated, and operational efficiency of the resources teamed together can by improved across the task (whether performed to schedule or otherwise).

In FIG. 1A, the first duty chart 110a for a first resource (e.g., a captain of an aircraft or other operator of a commercial service vehicle) shows that a first subtask 120a, a second subtask 120b, a third subtask 120c, and a fourth subtask 120d are scheduled in a duty period of the first resource. The second duty chart 110b for a second resource (e.g., a first officer) shows that a fifth subtask 120e, the third subtask 120c, the fourth subtask 120d, and a sixth subtask 120f are scheduled in a duty period of the second resource. Because the first duty chart 110a and the second duty chart 110b indicate that both the first resource and the second resource are assigned to the third subtask 120c and the fourth subtask 120d, the first and second resources are considered "teamed" across these subtasks 120c-d (although not teamed across the entire task). Although assigned to the same subtasks when teamed, each resource may perform different elements of the subtask (e.g., duties assigned to a captain versus duties assigned to a first officer) or may perform the same elements in parallel (e.g., for error correction or redundancy).

Additionally, the duty charts 110 indicate postings of the resources; not necessarily the assignment of particular resources to those postings. Accordingly, a first duty chart 110a for a first resource can be compared against a second duty chart 110b for a second resource to determine the potential teaming between those postings regardless of what individual resources are eventually assigned thereto. For example, a first duty chart 110a for a pilot and a second duty chart 110b for a co-pilot can show whether a pilot and a co-pilot are teamed across a trip regardless of whether Pilot A or Pilot B is assigned to the postings indicated in the first duty chart 110a or Co-pilot C or Co-pilot D is assigned to the posting indicated in the second duty chart 110b.

The third duty chart 110c for a third resource (e.g., a purser) shows that a seventh subtask 120g, the second subtask 120b, and an eighth subtask 120h are scheduled in a duty period of the third resource. The fourth duty chart 110d for a fourth resource (e.g., a flight attendant) shows that a ninth subtask 120i and the third subtask 120c are scheduled in a duty period of the fourth resource. Although the third resource is co-scheduled with the first resource for the second subtasks 120b, because the next subtask in the respective first duty chart 110a and third duty chart 110c are not co-scheduled, the first and third resources are not considered teamed across the respective subtasks. Similarly, although the fourth resource is co-scheduled with the first and second resources for the third subtask 120c, because the next subtask in the third duty chart 110c is not the fourth subtask 120d, the fourth resource is not considered teamed across the respective subtasks, despite the first and second resources being considered teamed.

In FIG. 1B, the first through fourth duty charts 110a-d are shown with subtask assignments that emphasize teaming across tasks. The first duty chart 110a and the second duty chart 110b show that both the first and second resources are assigned to the first through fifth subtasks 120e, and the first and second resources are therefore teamed across the task described in the duty period. Similarly, the third duty chart 110c and the fourth duty chart 110d show that both the third and fourth resources are assigned to the sixth subtask 120f, the third subtask 120c, and the seventh subtask 120g, and the third and fourth resources are therefore teamed across the task described in the duty period.

Although FIG. 1B shows that the first and second resources are teamed with one another, and the third and fourth resources are teamed with one another, the first and second resources are not shown as teamed with the third and fourth resources, despite being co-scheduled for the third subtask 120c. In various aspects, a scheduler can group different classes of resources together for teaming independently of one another. For example, a scheduler for an airline may attempt to group flight crew (e.g., captains and first officers) independently of cabin crew (e.g., pursers and flight attendants), and may attempt to team flight crews and cabin crews with the same or lesser emphasis or priority than when attempting to team the members of an individual flight or cabin crew.

In another example, a scheduler for a computing device may independently attempt to group cores of a general purpose processing unit into a first team and group cores of a graphical processing unit into a second team, and may attempt to team the general purpose and graphical core teams with a lesser emphasis or priority than when attempting to team into individual classes of cores.

In various aspects, the scheduler can divide the pool of resources into various classes that a teaming optimizer attempts to form various strata of teams from (e.g., a full crew from flight crew and cabin crew, a full process team from graphical teams and general teams, a plant-wide team from various sector teams, etc.)

FIGS. 2A-2D illustrate various teaming levels, according to aspects of the present disclosure. In various aspects, teaming across an entire duty period, although preferable, may not be possible. However, partial teaming may be preferred over no teaming, and various levels and types of partial teaming are possible. Accordingly, although the teaming optimizer described herein may be configured to give a highest priority to a whole-task teaming solution, the teaming optimizer can also provide some (albeit lesser) priority to partial task teaming solutions over non-teamed solutions.

Figure 2A:
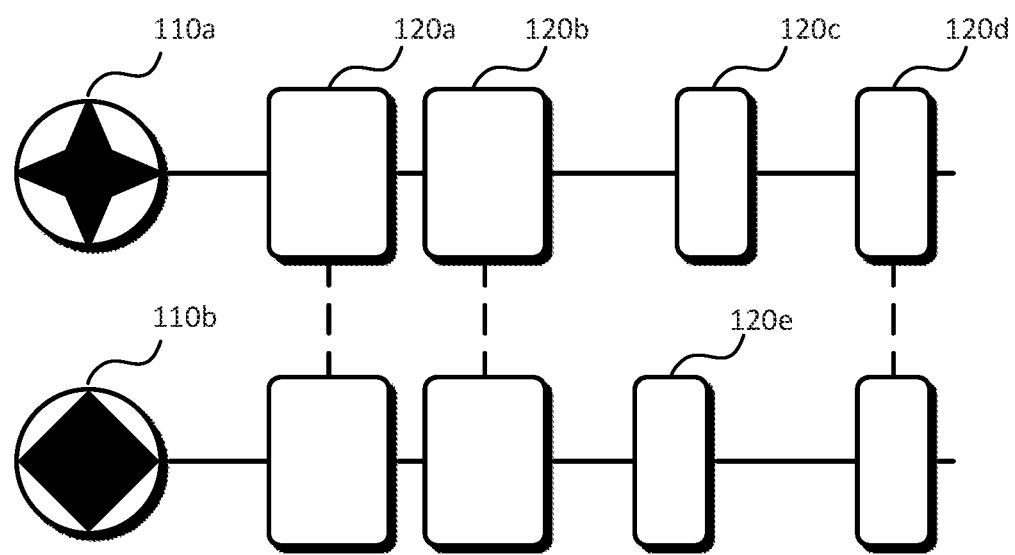
FIGS. 2A-2D illustrate various teaming levels, according to aspects of the present disclosure.

FIG. 2A illustrates connection teaming via a first duty chart 110a and a second duty chart 110b for respective first and second resources, according to an aspect of the present disclosure. Connection teaming occurs when at least two resources share assignment to one subtask and a subsequent subtask with no intervening subtasks. For example, as shown in FIG. 2A, the first resource and the second resource are both assigned to the first subtask 120a, the second subtask 120b, and the fourth subtask 120d. Because there are no intervening subtasks between the first subtask 120a and the second subtask 120b that are not assigned to both of the resources, the first duty chart 110a and the second duty chart 110b show connection teaming across the first and second subtasks 120a-b in FIG. 2A. In contrast, although the first and second resources are co-scheduled for the fourth subtask 120d, because the first resource and the second resource are not co-scheduled before the fourth subtask 120d (e.g., the first resource scheduled for the third subtask 120c and the second resource scheduled for the fifth subtask 120e after the second subtask 120b), the duty charts 110a-b do not show connection teaming for the fourth subtask 120d (and therefore do not show whole-task teaming). Even if the third subtask 120c and the fifth subtask 120e have the same start and end points (e.g., departing from Airport A and arriving at Airport B, thus allowing re-teaming for a later flight from Airport B), if the subtasks themselves are not the same (e.g., the early flight and the mid-day flight), the resources are not teamed for those subtasks.

Figure 2B:
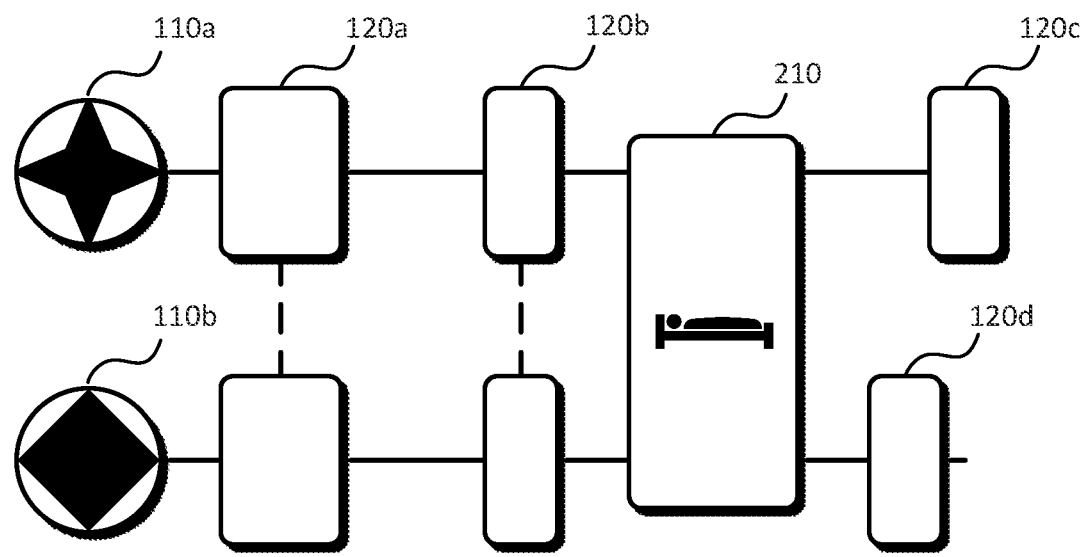

FIG. 2B illustrates duty-period teaming via a first duty chart 110a and a second duty chart 110b for respective first and second resources, according to an aspect of the present disclosure. Duty-period teaming occurs when a task is scheduled across duty periods and the subtasks scheduled within one duty period (but not necessarily the full set of subtasks for the task) are co-scheduled for a group of resources. In various aspects, a rest period 210 delineates two duty periods. A rest period 210 occurs when no subtasks 120 are assigned to the resources (e.g., due to duty cycle rules), but the task spans one or more duty periods. For example, a rest period 210 may be assigned between each day of a multi-day trip for an airline crew to give the crew time to rest between flights. In another example, a rest period 210 may be assigned every x processor cycles to allow the cores of the processors to resynchronize or perform error correction calculations.

As shown in FIG. 2B, the first resource and the second resource are both assigned to the first subtask 120a and the second subtask 120b before the rest period 210, and are not co-scheduled after the rest period (e.g., the first resource is scheduled to the third subtask 120c and the second resource is scheduled for the fourth subtask 120d). Accordingly, the first and second resources are teamed for the first duty period (before the rest period 210) and are not teamed for the second duty period (after the rest period 210), and the first and second duty charts 110a-b illustrate duty-period teaming, but not whole-task teaming.

Figure 2C:
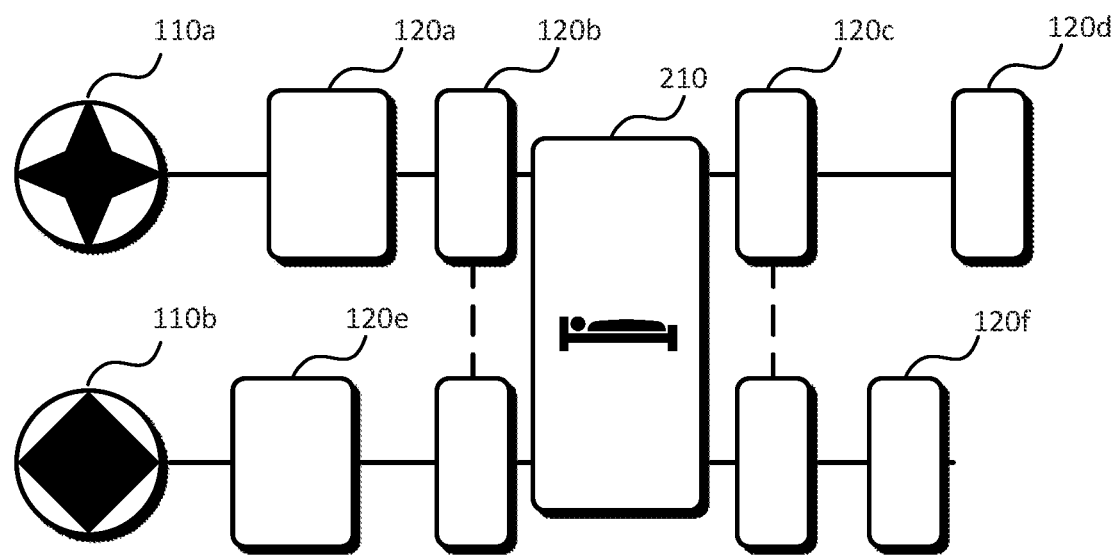

FIG. 2C illustrates cross-period teaming via a first duty chart 110a and a second duty chart 110b for respective first and second resources, according to an aspect of the present disclosure. The first duty chart 110a indicates that the first resource is assigned to a first subtask 120a, a second subtask 120b, a rest period 210, a third subtask 120c, and a fourth subtask 120d. The second duty chart 110b indicates that the second resource is assigned to a fifth subtask 120e, the second subtask 120b, a rest period 210, the third subtask 120c, and a sixth subtask 120f. Although the first and second resources are not teamed in either of the duty periods before or after the rest period 210, the duty charts 210a-b indicate that the first and second resources are teamed through the rest period 210. Because the resources are co-scheduled for the subtasks assigned directly before the rest period 210 (e.g., the second subtask 120b) and directly after the rest period 210 (e.g., the third subtask 120c). In various aspects, a scheduler may place emphasis or priority on cross-period teaming so that resources begin and end duty cycles at the same time.

In some aspects, all resources can be considered teamed or co-scheduled during or through a rest period 210. For example, when a pilot and a co-pilot are scheduled for a rest period 210 with a shared flight preceding the rest period 210 and a shared flight following the rest period 210, those resources can be considered teamed even if the pilot is assigned to a first hotel and the co-pilot to a second hotel. In other aspects, how or when a resource is assigned to a rest period 210 determines whether particular resources are considered teamed or co-scheduled during or through the rest period 210. Using the previous example, the pilot and co-pilot may be considered not teamed through the rest period 210 due to the potential for different delays in arriving at the respective hotels or back to the airport. Accordingly, operator of the teaming optimizer can select whether to consider two resources as co-scheduled during a rest period 210 based on various factors.

Figure 2D:
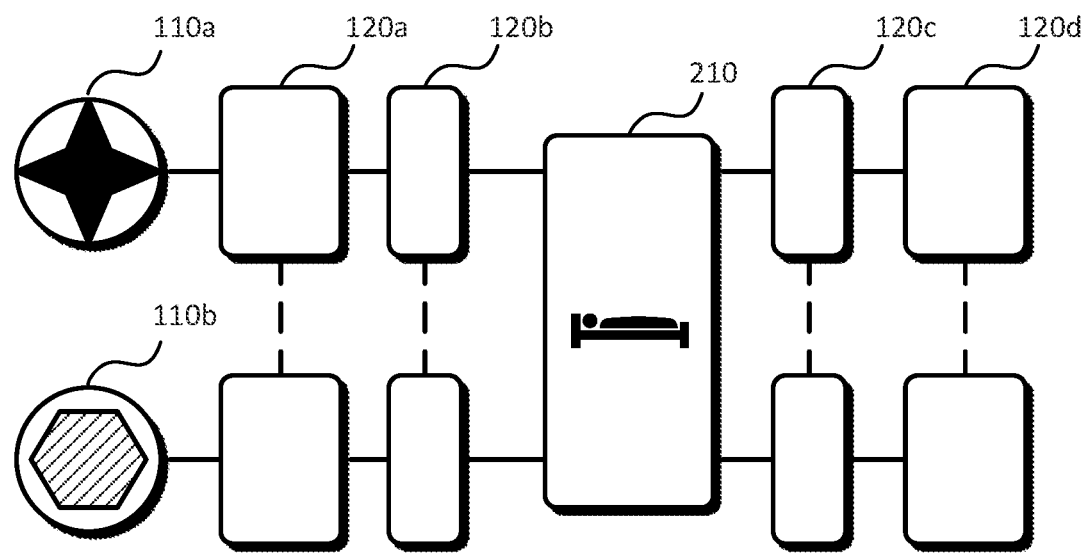

FIG. 2D illustrates cross-class teaming via a first duty chart 110a and a second duty chart 110b for respective first and second resources of different classes, according to an aspect of the present disclosure. As illustrated by the respective duty charts 110a-b in FIG. 2D, both the first resource and the second resource are co-scheduled for a first subtask 120a, a second subtask 120b, through a rest period 210, a third subtask 120c, and a fourth subtask 120d. Accordingly, if the first through fourth subtasks 120a-d represent all of the subtasks in a given task, the first and second resources would be teamed for the entire task (i.e., indicating whole-task teaming). However, as indicated in the present example, the first resource and the second resource belong to different classes (e.g., a flight crew member versus a cabin crew member, a graphical processor core versus a general processor core). Therefore the teaming optimizer may, in some aspects, provide no emphasis or priority to the teaming, or less weight to the teaming than if the resources belonged to the same class to thereby prioritize in-class teaming over cross-class teaming.

Figure 3A:
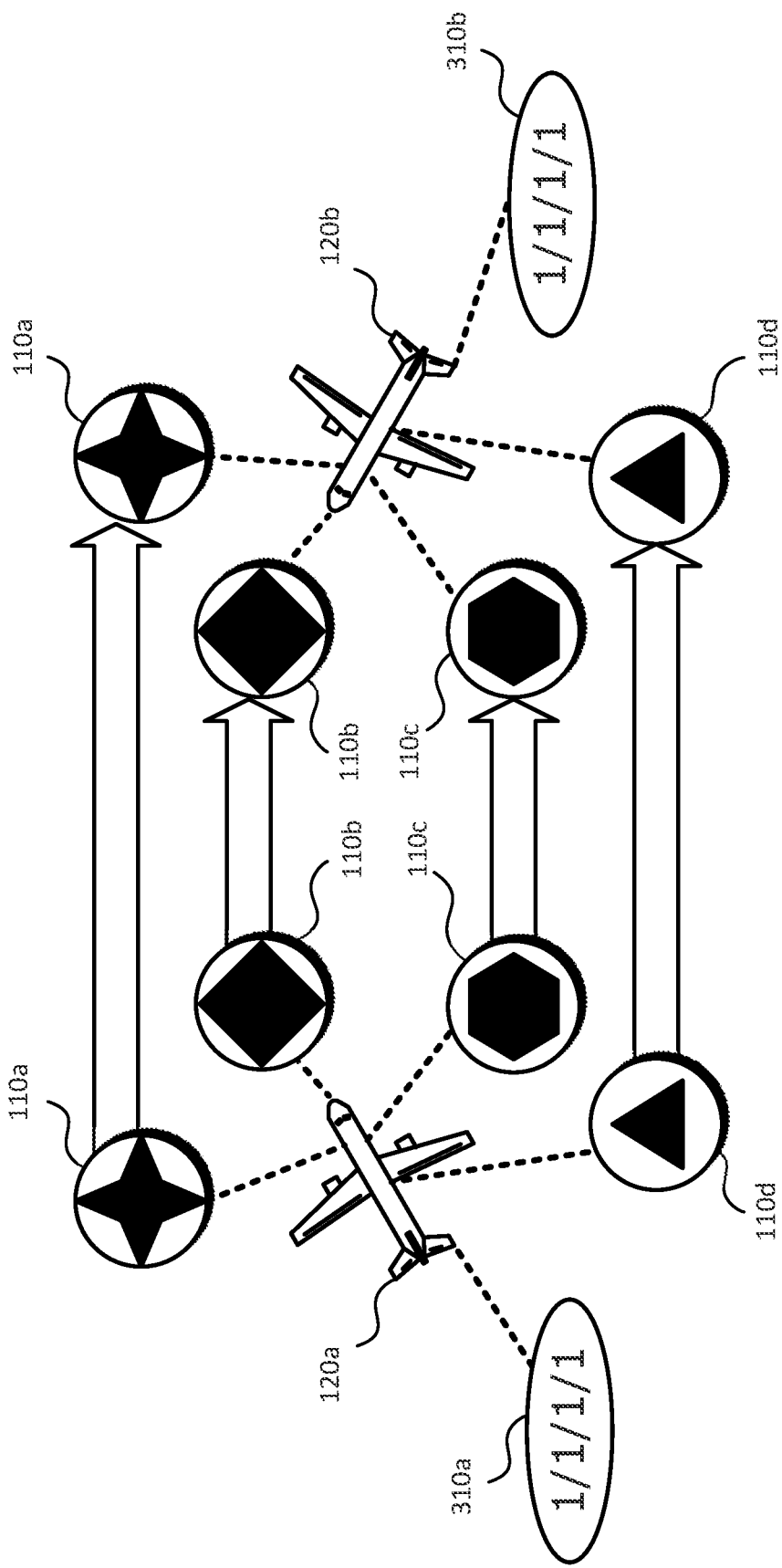
FIGS. 3A-3D illustrate various teaming scenarios, according to aspects of the present disclosure.
Figure 3B:
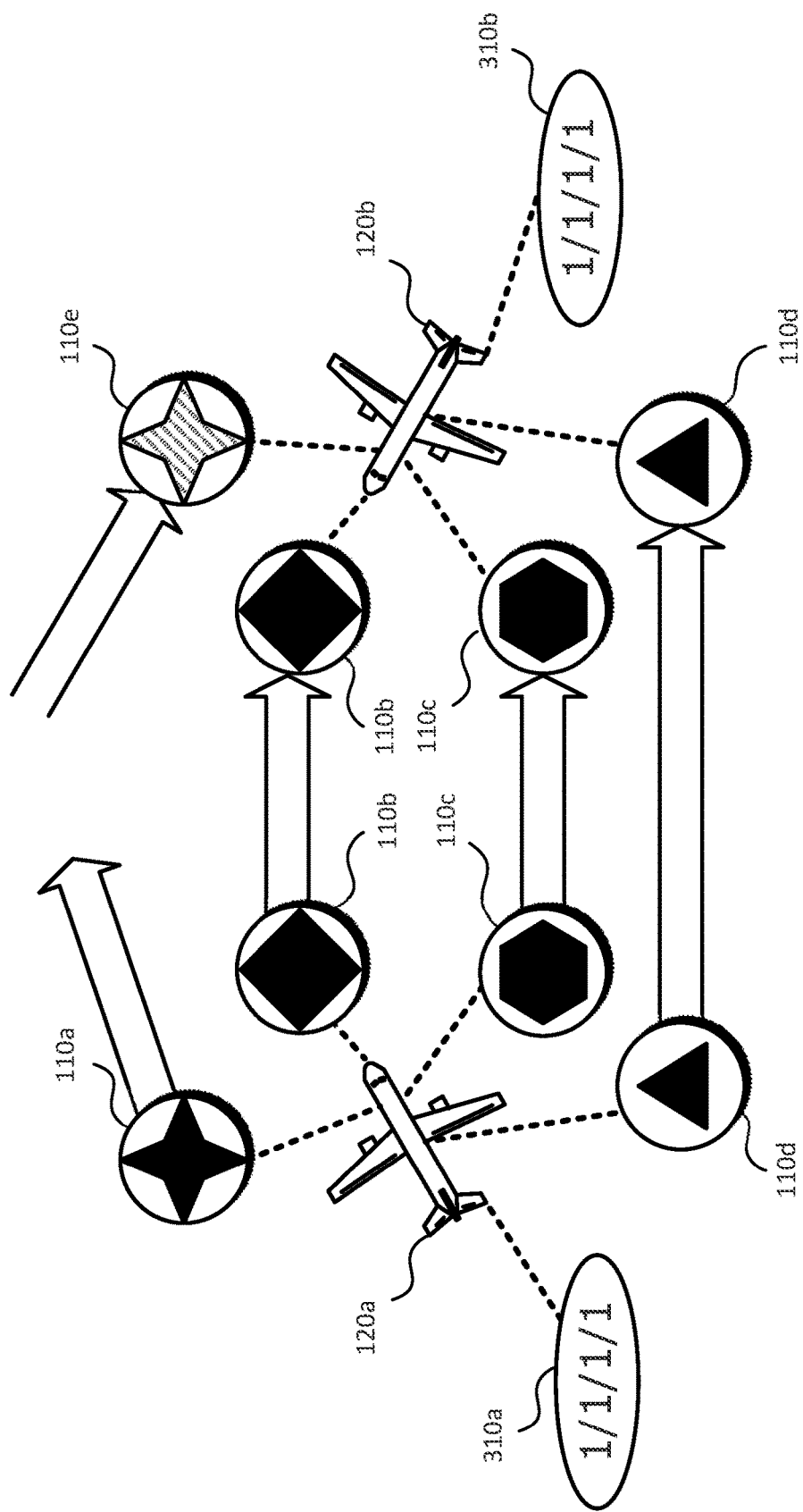
Figure 3C:
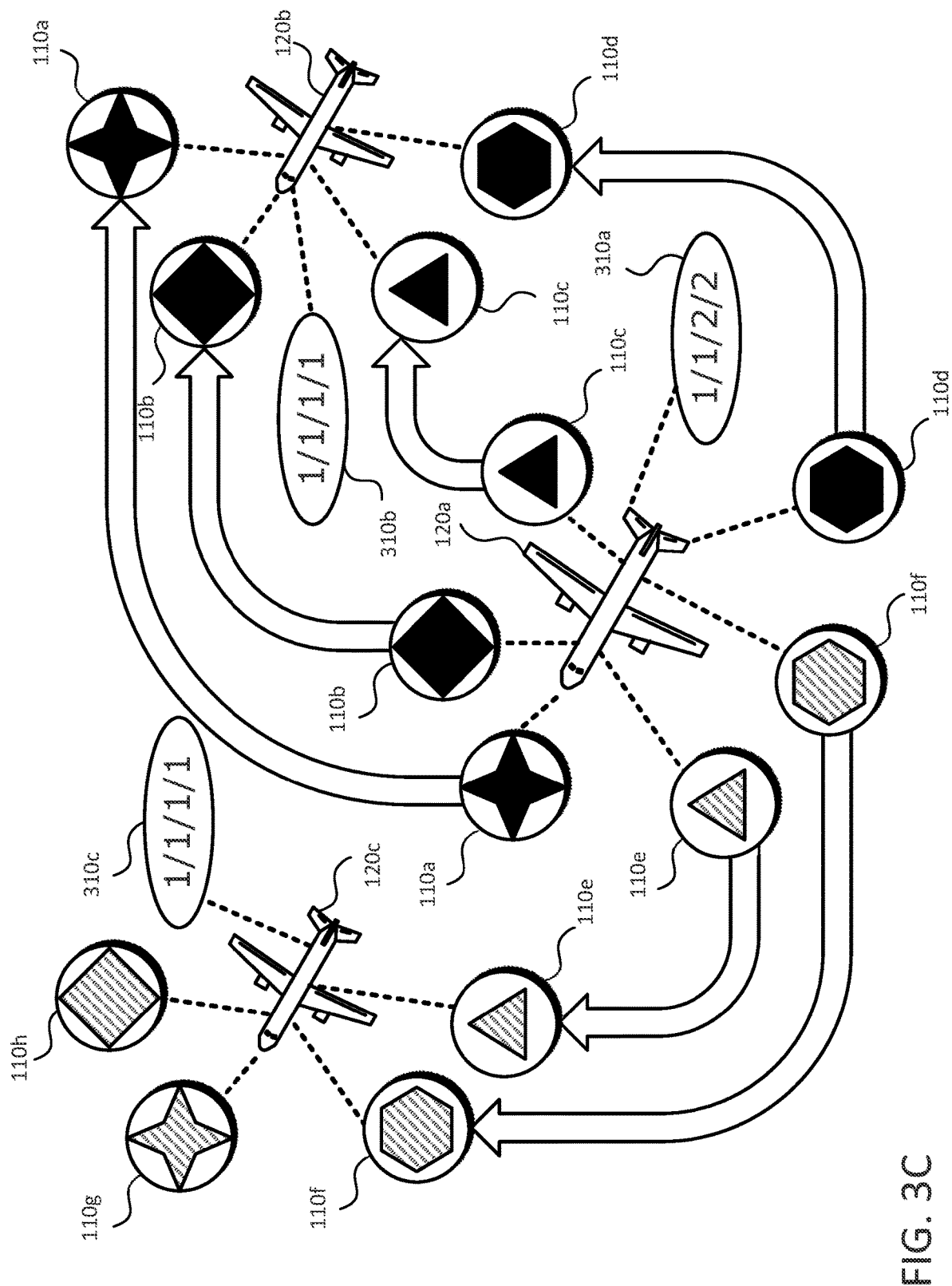

FIGS. 3A-3C illustrate various teaming scenarios, according to aspects of the present disclosure.

FIG. 3A illustrates a full teaming scenario across two subtasks 120a-b, according to an aspect of the present disclosure. For example, a first subtask 120a of a flight leg may have a corresponding first resource requirement 310a (generally or collectively resource requirement 310) that specifies that the flight requires one pilot, one co-pilot, one purser, and one flight attendant for full staffing (e.g., indicated in the Figures as 1/1/1/1 for the respective number of crew in each position). Similarly, a second subtask 120b of a different flight leg is shown as having a corresponding second resource requirement 310b also for one pilot, one co-pilot, one purser, and one flight attendant. When the respective duty charts 110a-d for each of a first resource (e.g., of a pilot), a second resource (e.g., of a co-pilot), a third resource (e.g., of a purser), and a fourth resource (e.g., a flight attendant) indicate that the resource requirements 310a-b of the subtasks 120a-b are met by the same resources, the subtasks 120a-b have been fully teamed relative to one another. This may occur, for example, when several legs of a trip are served by the same crew (whether on one aircraft or across multiple aircraft). However, due to rules related to duty cycles, different ongoing needs for resources across a duty period, and the like, maintaining a set of resources across several subtasks 120 may not be feasible, and instead, various sets of resources may be substituted, fractured, or combined over time (e.g., as per FIGS. 3B-3D).

FIG. 3B illustrates a partial teaming scenario across two subtasks 120a-b, according to an aspect of the present disclosure. For example, a first subtask 120a of a flight leg may have a corresponding first resource requirement 310a that specifies that the flight requires one pilot, one co-pilot, one purser, and one flight attendant for full staffing. Similarly, a second subtask 120b of a different flight leg is shown as having a corresponding second resource requirement 310b also for one pilot, one co-pilot, one purser, and one flight attendant. When at least one resource is not maintained across the subtasks 120a-b (e.g., due to duty rules, greater need for the resource in another subtask), the teaming optimizer identifies a new resource to use in the subtasks 120a-b. For example, a first resource of an initial pilot may be substituted for a fifth resource of a new pilot when the initial pilot has flown for a threshold number of hours during a duty period. Accordingly, the respective duty charts 110b-d for each of a second resource (e.g., of a co-pilot), a third resource (e.g., of a purser), and a fourth resource (e.g., a flight attendant) indicate that the resource requirements 310a-b of the subtasks 120a-b are partially met by the same resources. In contrast, the duty charts 110a, 110e of the first and fifth resources (e.g., of initial and new pilots) indicate that a change in resources occurs between the first and second subtasks 120a-b.

When full teaming is not possible across subtasks of a given task, the teaming optimizer may attempt to maintain groups or sub-teams according to various criteria rather than treating each resource individually. For example, the teaming optimizer can attempt to keep the sub-team of the second through fourth resources from FIG. 3B together across subsequent flight legs via a teaming metric as a criterion configured to reward partial teaming, albeit less than full-teaming is rewarded. Operation of the teaming optimizer in emphasizing and prioritizing partial teaming is discussed in greater detail in regard to FIGS. 5A-5C, 6, and 7 of the present disclosure.

FIG. 3C illustrates a fractured teaming scenario across subtasks, according to an aspect of the present disclosure. When the resources requirements decrease from an initial subtask to a subsequent subtask in a task, various resources may be reassigned to a different task. In various aspects, the teaming optimizer attempts to maintain a core team of resources within the task based on the lowest resource requirement group within an individual subtasks of the tasks, but may also attempt to keep any resources that are removed from the initial task teamed together in a different task.

For example, in a task of a flight trip composed of several legs (i.e., the individual flights scheduled for a departure from a first airport and arrival at a second airport), the resource requirements can vary across different flights. As shown in FIG. 3C, a first trip (from the perspective of a first resource of a pilot) includes a first subtask 120a of a first fight leg has a first resource requirement 310a that is greater than second resource requirement 310b of a second subtask 120b of a second flight leg. Accordingly, the resources assigned to the first subtask 120a cannot all be assigned to the second subtask 120b, and instead some may be left idle, supplemented by additional resources, assigned to different subtasks, and combinations thereof; thus fracturing the initial set of assigned resources.

In various aspects, when fracturing the initial resource set assigned to the first subtask 120a, the teaming optimizer seeks to maintain as much of the initial resource set as possible across subtasks and different tasks. Accordingly, the difference between the first resource requirement 310a and the second resource requirement 310b can result in forming sub-teams of the resources that are maintained on different tasks. For example, the first through fourth resources may be assigned to a task that includes the first subtask 120a and the second subtask 120b as a first task via the respective duty charts 110a-d, while the fifth and sixth resources may be assigned to a task that include the first subtask 120a and the third subtask 120c via the respective duty charts 110e-f.

In the example illustrated in FIG. 3C, the first through fourth resources remain teamed across the first subtask 120a and the second subtask 120b, and the fifth and sixth resource remain teamed across the first subtask 120a and the third subtask 120c, although various fracturing arrangements are possible in different aspects.

Figure 3D:
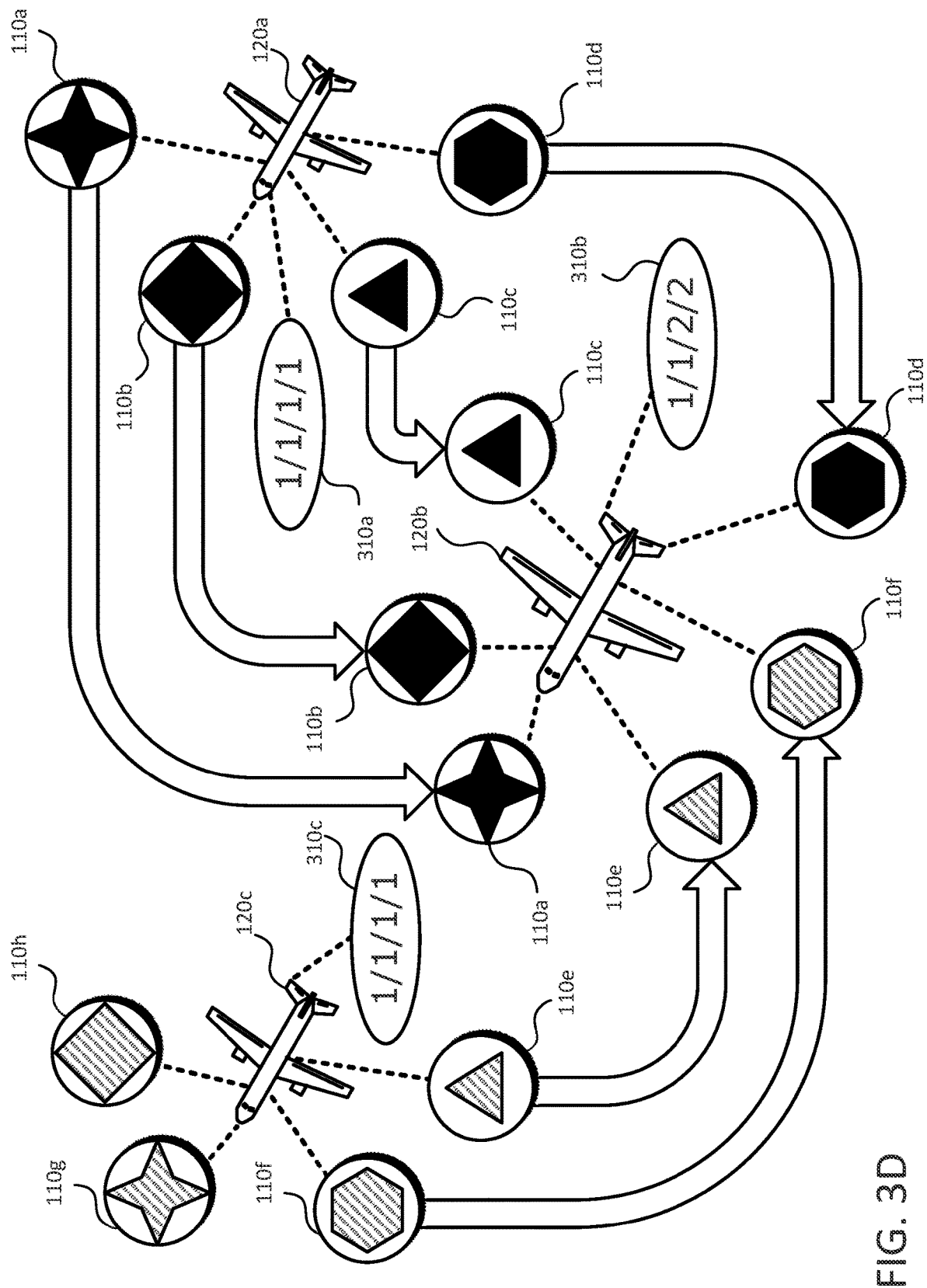

FIG. 3D illustrates an augmenting teaming scenario across subtasks, according to an aspect of the present disclosure. When the resources requirements increase from an initial subtask to a subsequent subtask in a task, various resources may be reassigned from a different task. In various aspects, the teaming optimizer attempts to break apart as few teams from other tasks, or maintain coherent teams of resources across tasks based on the lowest resource requirements of the individual subtasks.

For example, in a task of a flight trip composed of several legs (i.e., the individual flights scheduled for a departure from a first airport and arrival at a second airport), the resource requirements can vary across different flights. As shown in FIG. 3D, a first trip (from the perspective of a first resource of a pilot) includes a first subtask 120a of a first fight leg has a first resource requirement 310a that is less than second resource requirement 310b of a second subtask 120b of a second flight leg. Accordingly, the resources assigned to the first subtask 120a need to be augmented or to meet the second resource requirements 310b for the second subtask 120b, thus potentially leaving some resources left idle, supplementing the initial resources with additional resources that are idle or assigned to different subtasks, and combinations thereof; thus augmenting the initial set of assigned resources with new resources.

When augmenting the initial resource set assigned to the first subtask 120a, the teaming optimizer seeks to maintain as much of the initial resource set as possible across subtasks and different tasks. Accordingly, the difference between the first resource requirement 310a and the second resource requirement 310b can result in identifying sub-teams that can be removed from one task and reassigned, as a team, to the new subtask. For example, the first through fourth resources may be assigned to a task that includes the first subtask 120a and the second subtask 120b as a first task via the respective duty charts 110a-d. To augment the first through fourth resources to satisfy the second resource requirements 310b, the teaming optimizer assigns the fifth and sixth resources (via the associated duty charts 110d-e) from the third subtask 120c to the second subtask 120b.

By assigning the fifth and sixth resources to the second subtask 120b rather than to a task shared with the duty charts 110g-h of the seventh and eighth resources, the teaming optimizer may break apart a team made up of the fifth through eighth resources. In various aspects, the teaming optimizer can assign different priorities for teams made up of multiple resource classes, for maintaining larger teams versus smaller teams, or for specific makeups of teams. For example, if the teaming optimizer ignores teaming across resource types, assigning cabin crew resources separately from flight crew resources may not be considered as dividing a "team" of resources. In another example, if the teaming optimizer maintains "teams" as paired resources (e.g., a senior crew member with a junior crew member), the example in FIG. 3D would illustrate maintaining (at least) four teams (e.g., the first and second resources, the third and fourth resources, the fifth and sixth resources, and (potentially) the seventh and eighth resources).

Figure 4:
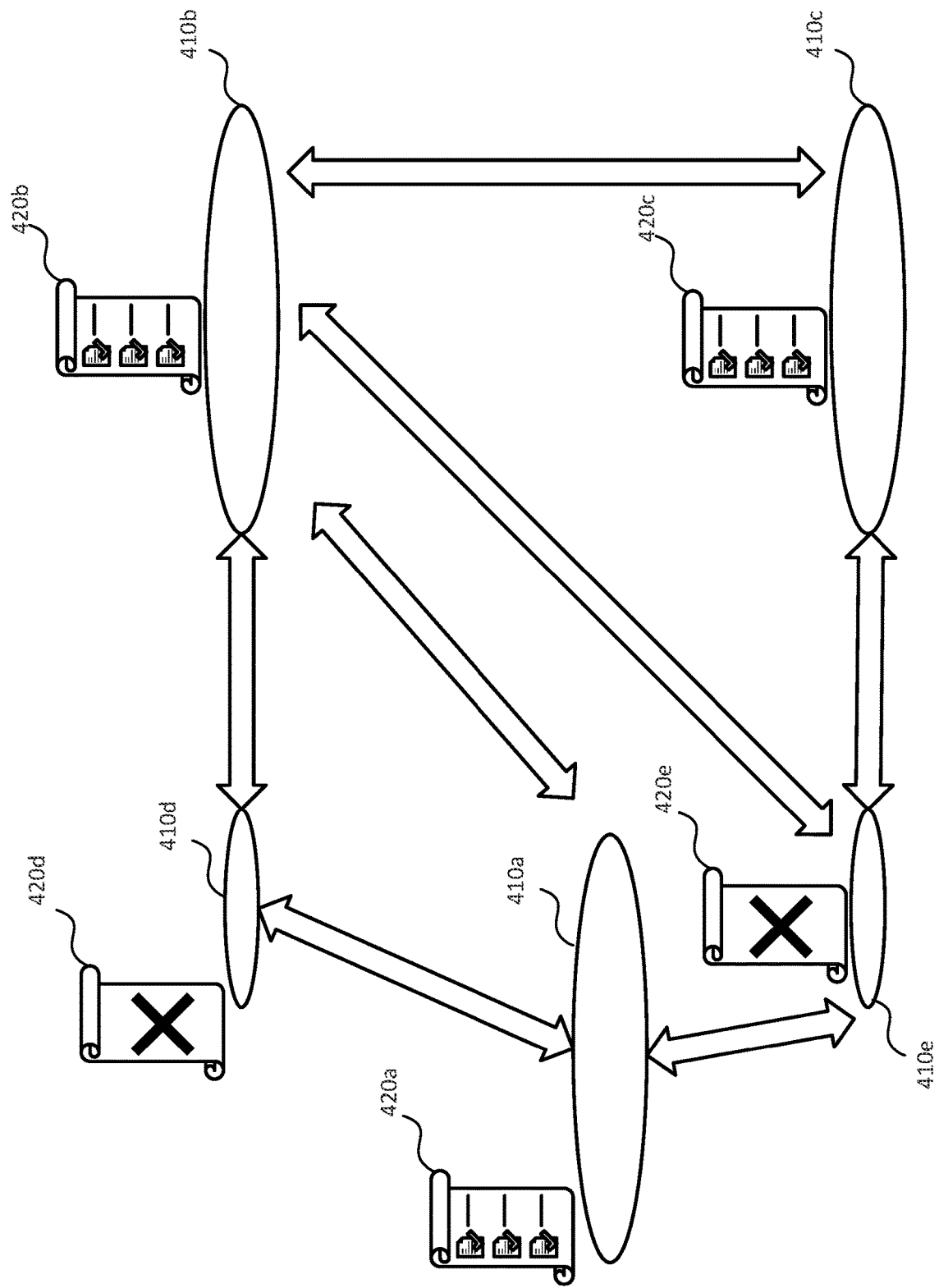
FIG. 4 illustrates a state consideration handled as an input by the teaming optimizer, according to aspects of the present disclosure.

FIG. 4 illustrates a state consideration handled as an input by the teaming optimizer, according to aspects of the present disclosure. Various resources are associated with different states as a "home" or "base" state, and in various aspects, the teaming optimizer prioritizes using resources over the course of a task so that the resources begin and end the task at a given state. The various states can include various metrics in various aspects, such as, but not limited to: a base of operation for flight crews, a heat level for processor cores, a water level for reservoirs, etc.

For example, when assigning batteries (as a resource) for serving an electrical load (as a task), the charge state of those batteries may begin at an initial charge level and end an a final charge level (as states of, e.g., 0%, 20%, 50%, 100% charge), and the teaming optimizer may manage charging/discharging subtasks so at the end of serving the electrical loads the batteries return to the initial charge level (e.g., in preparation for the next task).

In another example, when assigning flight crew (as a resource) for staffing a flight trip (as a task), the teaming optimizer may track the airport that the crewmember is located at as the state of the crewmembers (e.g., at Airport A, Airport B, Airport C, etc.). Accordingly, the teaming optimizer may manage the arrivals and departures associated with the individual legs so that crewmembers are assigned to initial legs that depart a base airport for those crewmembers and return to that base airport at the end of the flight trip, regardless of which intermediate states the crewmembers have during the trip.

Five states 410a-e are shown in FIG. 4 with corresponding resource rosters 420a-e (generally or collectively, roster 420) that indicate which resources are associated with each state. For example, a first resource roster 420a indicates the resources that are associated with a first state 410a, a second resource roster 420b indicates the resources that are associated with a second state 410b, etc. In various aspects, some of the resource rosters may be empty or indicate that no resources are associated with the corresponding state. For example, an airline may operate out of several hub airports that act as bases for crew, but may serve several non-hub airports, and thus the hubs (as a first through third states 410a-c) are associated with rosters 420a-c that indicate the individual crew members based out of those airports, while the non-hubs (as the fourth and fifth states 410d-e) are associated with rosters 420d-e with no listed resources.

Continuing the example, because an airline generally wants to organize trips (as tasks) so that crew return to the hub from which the trip originated by the end of the task, the teaming optimizer is configured to prioritize having the task begin and end at the same airport regardless of where the individual legs of the trip (as subtasks) send the crew. Accordingly, the teaming optimizer prioritizes selecting resources to team together that begin at the same initial state and return to that initial state, but can provide different starting/ending points for resources associated with different states.

For example, the teaming optimizer selects a first team based out of Airport A (e.g., the first state 410a) from the first roster 420a and may design a trip to Airport B (e.g., the second state 410b), to Airport D (e.g., the fourth state 410d), and that returns to Airport A. During the same trip optimization example, the teaming optimizer can select a second team based out of Airport A for a second trip (e.g., to Airports B, D, and E at different times or in a different order, or to a different set of airports) and a third team based out of Airport C (e.g., the third state 410c) for a third trip that begins and ends at Airport C.

Although the teaming optimizer prioritizes avoiding leaving a resource at a state other than the associated state at the end of a task, or assigning a resource to begin a task at a state other than the associated state, in some cases an orphaned or dead-headed assignment (e.g., subtasks that leave a resource at a non-base state at the end of the task or require the resource to begin at a non-base state) may be necessary. Accordingly, the teaming optimizer can, when necessary, assign a resource selected from a first roster 420a to a task with an initial subtask not beginning at the first state 410a, with a final subtask not ending at the first state 410a, or combinations thereof. For example, a pilot associated with airport A may be assigned to a first flight departing from airport B as a dead-headed assignment. In another example, a reservoir associated with a given water level may be assigned a final subtask that ends with a different water level than the initial water level (e.g., discharging through a hydroelectric plant faster than current inflow) as an orphaned assignment.

In various aspects, the teaming optimizer can include rules that permit a resource to be assigned to only begin, only end, or both begin and end at a different state than is associated with the resource. Similarly, the teaming optimizer may follow rules that specify which states a given resource can be assigned to begin or end a task at if not the associated state for that resource (e.g., a pilot may end tasks at airports within x kilometers of the base for the pilot or at a hub airport).

Figure 5A:
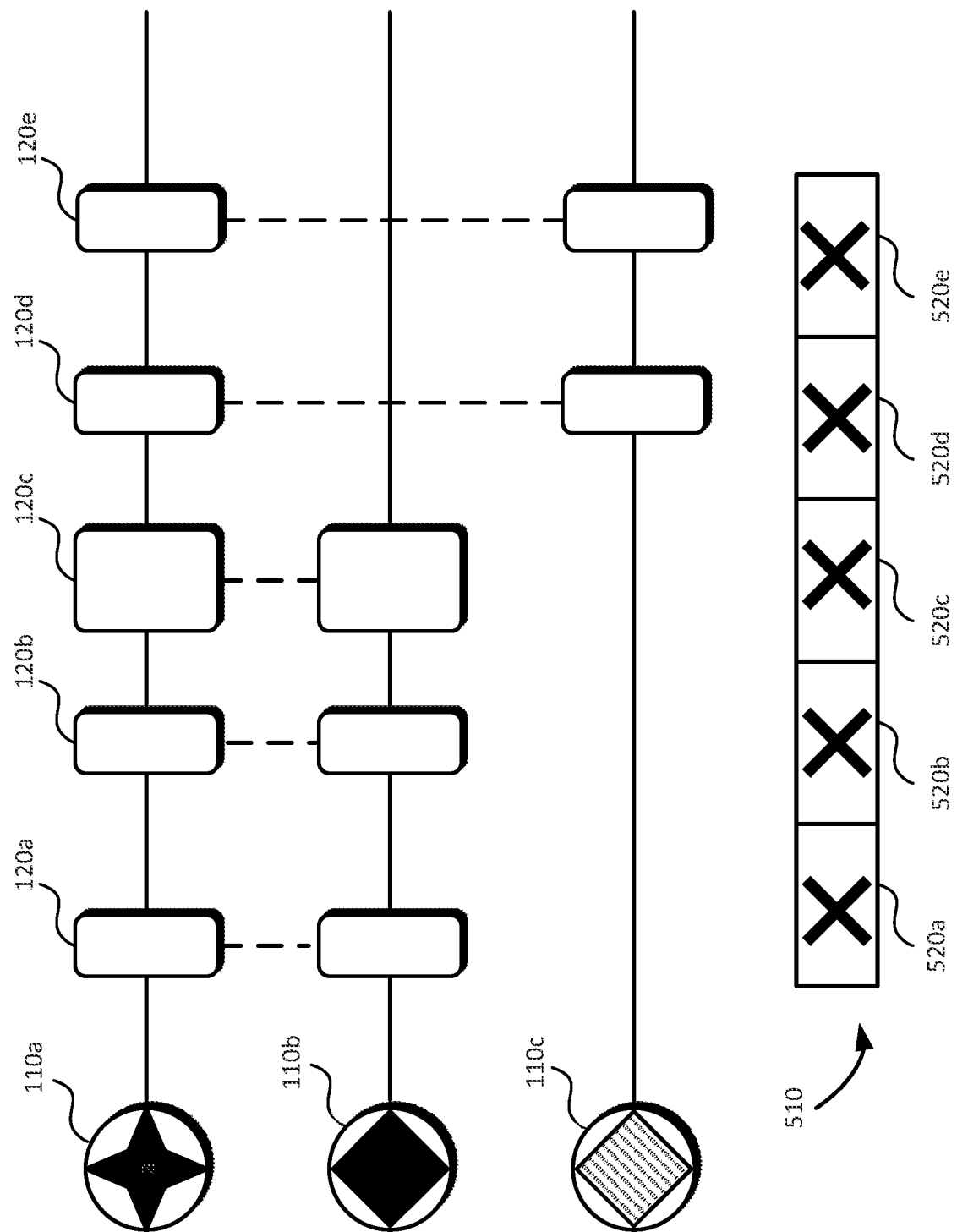
FIGS. 5A-5C illustrate teaming evaluations, according to aspects of the present disclosure.
Figure 5B:
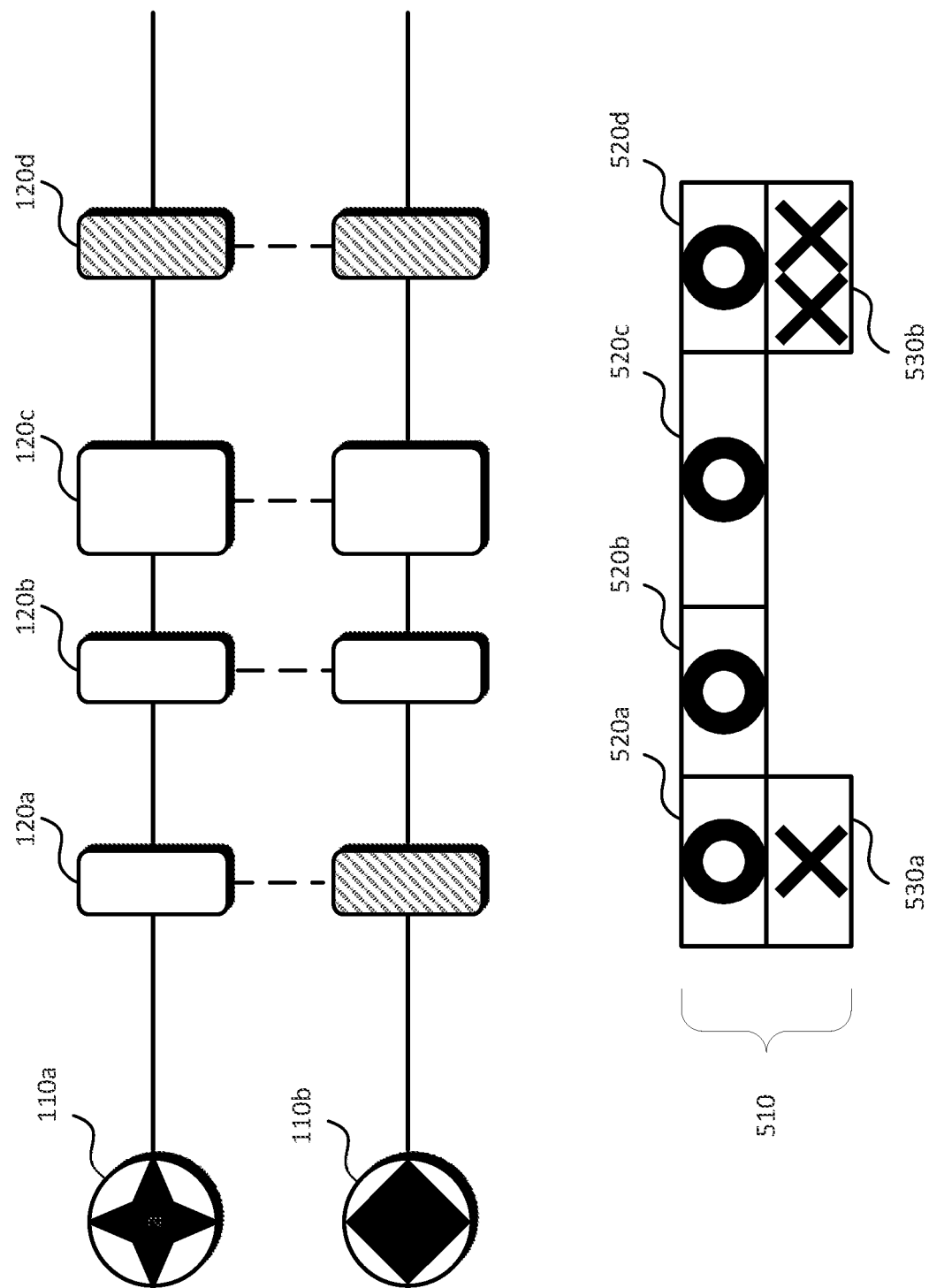
Figure 5C:
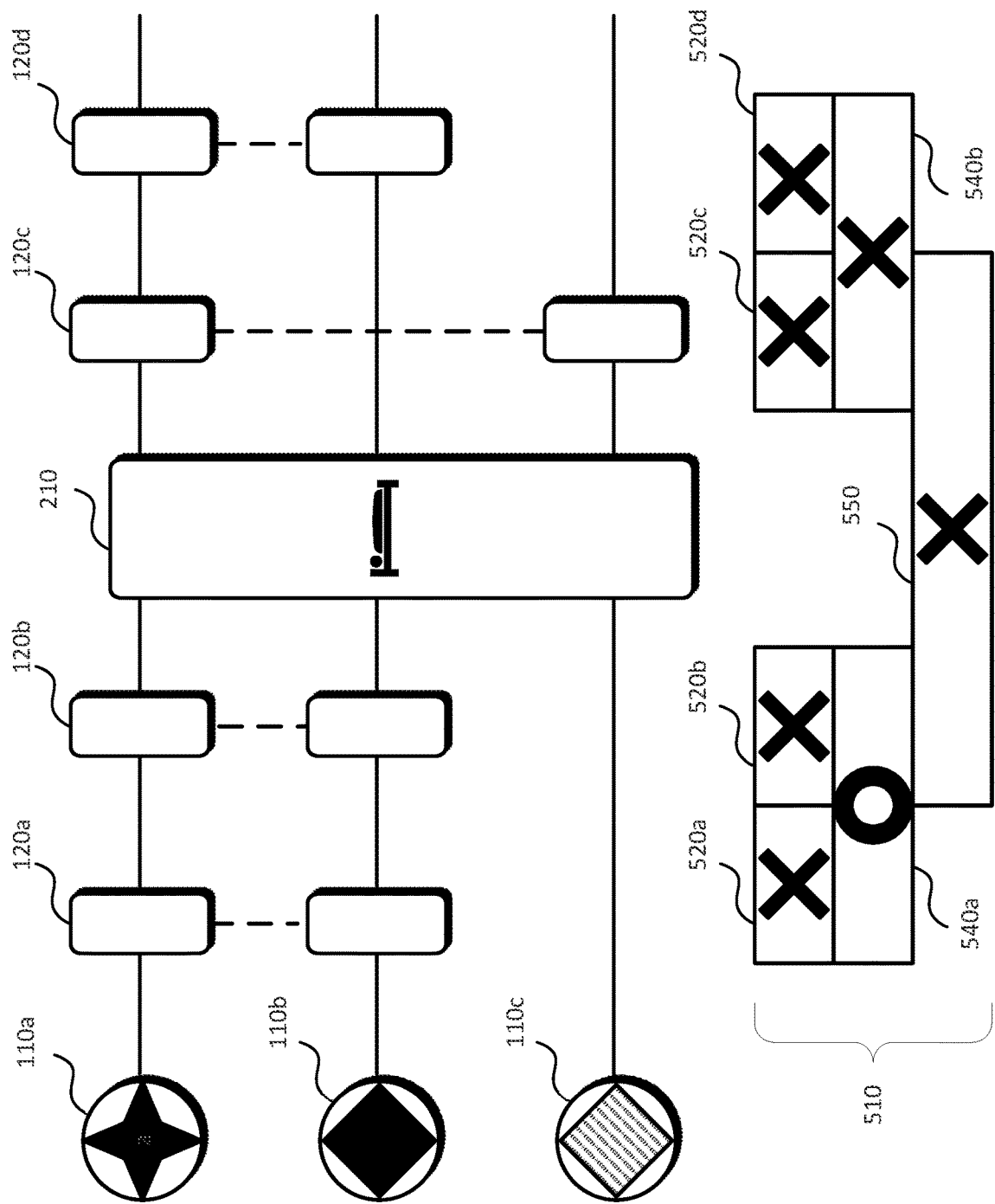

FIGS. 5A-5C illustrate teaming evaluations, according to aspects of the present disclosure. When the teaming optimizer evaluates a potential task assignment as a set of resources to be assigned to tasks, various teaming arrangements may be given different positive or negative weights to compare potential tasks assignments against one another. The teaming optimizer can weight different elements of a teaming metric 510 differently in various aspects to encourage or discourage various resource assignments, and the teaming metric 510 can be one of several metrics used to select an optimized resource-to-task assignment set.

For example, when assigning flight crew resources to flight tasks, the teaming optimizer can place a greater emphasis on forming larger teams for connection teaming (or whole trip teaming) when a flight leg passes through an international airport, and lower emphasis when the flight legs are entirely domestic. In another example, an airline may indicate that a teaming metric 510 is of greater or lesser priority compared to a preference metric, so that a combinational optimizer can select whether to value the preferences of crew for a given route assignment with higher or lower emphasis compared to maintaining a coherent team of flight crew over the assigned route according to the teaming metric.

Although generally described as penalizing undesirable assignments, the teaming optimizer can instead reward desirable assignments, or apply a combination of penalties and bonuses to both penalize and reward different assignment features. Accordingly, the teaming metrics 510 illustrated in FIGS. 5A-5C are shown with various evaluations with negative emphasis (illustrated as an X) or positive emphasis (illustrated as an O), which may be associated with different values (positive, negative, or neutral) in different aspects.

FIG. 5A illustrates a first teaming arrangement where the first through third duty charts 110a-c of the respective first through third resources are shown with partial teaming over a task. As shown, a first subtask 120a, a second subtask 120b, and a third subtask 120c are all assigned to both the first and second duty charts 110a-b, whereas a fourth subtask 120d and a fifth subtask 120e are assigned to both the first duty chart 110a and the third duty chart 110c. The illustrated teaming metric 510 includes five subtask evaluations 520a-e (generally or collectively, subtask evaluations 520) corresponding to the five subtasks 120a-e for the evaluated task. When evaluated solely for whole-task teaming, because a coherent team of resources is not assigned across the set of subtasks making up the task, each subtask evaluation 520a-e is given a negative weight (e.g., de-prioritization), despite partial teaming in individual segments of the task.

In aspects in which the teaming optimizer applies additive penalties or bonuses to each subtask evaluation 520 of an evaluated task, tasks with a greater number of subtasks can experience a greater overall penalty (or lower overall bonus) for lacking whole-task teaming than tasks with lower numbers of subtasks, despite (potentially) having more individually paired subtasks. In various aspects, the additive nature of penalties/bonuses prioritizes or emphasizes whole-task teaming for tasks with more subtasks over whole-task teaming for tasks for fewer subtasks. In other aspects, the additive nature of penalties/bonuses is undesirable or only desirable up to a threshold, and the teaming optimizer may normalize or cap the penalty or bonus assigned to a teaming metric 510 to constrain the effect of the number of subtasks in the task on the overall penalty/bonus assigned based on whole-task teaming.

FIG. 5B illustrates a second teaming arrangement where a first duty chart 110a and a second duty chart 110b of corresponding first and second resources are shown with full teaming over a task, but with state mismatches for the assignment of initial and final subtasks. As shown, a first subtask 120a, a second subtask 120b, a third subtask 120c, and a fourth subtask 120d are all assigned to both the first and second duty charts 110a-b, thus displaying whole-task teaming. The first through fourth subtasks 120a-d represent all of subtasks the task in this example, and the illustrated teaming metric 510 includes four subtask evaluations 520a-d corresponding to the four subtasks 120a-e for the evaluated task, all indicating a positive emphasis for the teaming arrangement.

However, the teaming optimizer can also, separately or jointly with the analysis of teaming between resources over the task, evaluate whether the assigned resources begin or end the task in an associated state for each resource. For example, when assigning a pilot and copilot (as the teamed resources) to a set of flight legs (as subtasks) over a trip (as the task), the teaming optimizer can evaluate whether the individual crew members begin and end the trip at a base airport (as an associated state for the resources).

As shown in the second duty chart 110b, the second resource begins the task in a non-associated state, and a first state evaluation 530a indicates a negative emphasis for this assignment due to the state mismatch between the second resource and the initial state of first subtask 120a (e.g., a copilot scheduled for a first flight leg from an airport other than where the copilot is based out of).

Similarly, as shown in both the first duty chart 110a and the second duty chart 110b, the first and second resources both end the task in non-associated states, and the teaming optimizer assigns a negative evaluation in the second state evaluation 530b for this assignment due to the state mismatches.

In various aspects, the teaming optimizer may apply a flat penalty (e.g., a predefined, non-variable penalty) for at least one resource beginning or ending a task at a non-associated state, or may apply a cumulative penalty for each resource assigned to begin or end a task in a non-associated state. For example, when the teaming optimizer assigns flat penalties for the mismatched states in FIG. 5B, the teaming optimizer can assign the same (negative) value to the first state evaluation 530a as the second state evaluation 530b, despite the different number of resources mismatched to the beginning and ending states in the task. When the teaming optimizer assigns cumulative penalties for the mismatched states in FIG. 5B, the teaming optimizer can assign a lower (less negative) value to the first state evaluation 530a compared the second state evaluation 530b (e.g., adding, multiplying, or otherwise scaling upward the penalty for one resource-to-state mismatch to reflect a higher penalty for a greater number of resource-to-state mismatches).

In various aspects, the teaming optimizer can further scale the penalty assigned in the state evaluations 530a-b based on a direction or magnitude of the mismatch, a priority of the resource, whether the mismatch occurs at the beginning or end of the task, and combinations thereof.

For example, when evaluating the charge level (as a state) of a battery (as a resource), beginning a task at a different state than the battery's base state may be possible by preemptively overcharging or discharging the battery, and the teaming optimizer may assign a lower penalty for discharging versus overcharging, and lower penalties for smaller overcharges/discharges versus larger overcharges/discharges. Accordingly, the teaming optimizer can provide a first penalty for preemptively discharging a battery by 2% of capacity, a second penalty for preemptively overcharging by 2% of capacity, and a third penalty for preemptively discharging a battery by 10%, where the first penalty is less than the second penalty and the second penalty is less than the third penalty. In another example, an airline may configure the teaming optimizer to assign higher penalties for pilots (as resource) beginning trips (as tasks) from a non-associated airport (as a state) than the penalties assigned for ending trips at non-associated airports, but to assign higher penalties for more senior pilots being assigned to non-associated airports than more junior pilots.

FIG. 5C illustrates a third teaming arrangement where the first through third duty charts 110a-c of the respective first through third resources are shown with partial teaming over a task that includes a rest period 210. As shown, a first subtask 120a, a second subtask 120b, a third subtask 120c, and a fourth subtask 120d are all assigned to both the first and second duty charts 110a-b, whereas a third subtask 120c is assigned to both the first duty chart 110a and the third duty chart 110c. The illustrated teaming metric 510 includes four subtask evaluations 520a-d corresponding to the four subtasks 120a-d for the evaluated task.

Similarly to FIG. 5A, when evaluated solely for whole-task teaming, each subtask evaluation 520a-e is given a negative emphasis, despite partial teaming in individual segments of the task. However, the teaming optimizer can provide additional analyses for partial teaming in the teaming metric 510 to emphasize or deemphasize specific subsections of the task where teaming does or does not exist. For example, the teaming optimizer can include a first duty-period evaluation 540a and a second duty-period evaluation 540b in the teaming metric 510 to evaluate individual duty periods of the task (e.g., for duty-period teaming as per FIG. 2B) so that if teaming exists in some (but not all) of the duty periods in a task, the partial teaming is reflected in the overall evaluation. In another example, the teaming optimizer can include a cross-period evaluation 550 to evaluate whether teaming exists across a rest period 210, but not across all of the subtasks (e.g., for cross-period teaming as per FIG. 2C), to thereby reflect the partial teaming in the overall evaluation.

Figure 6A:
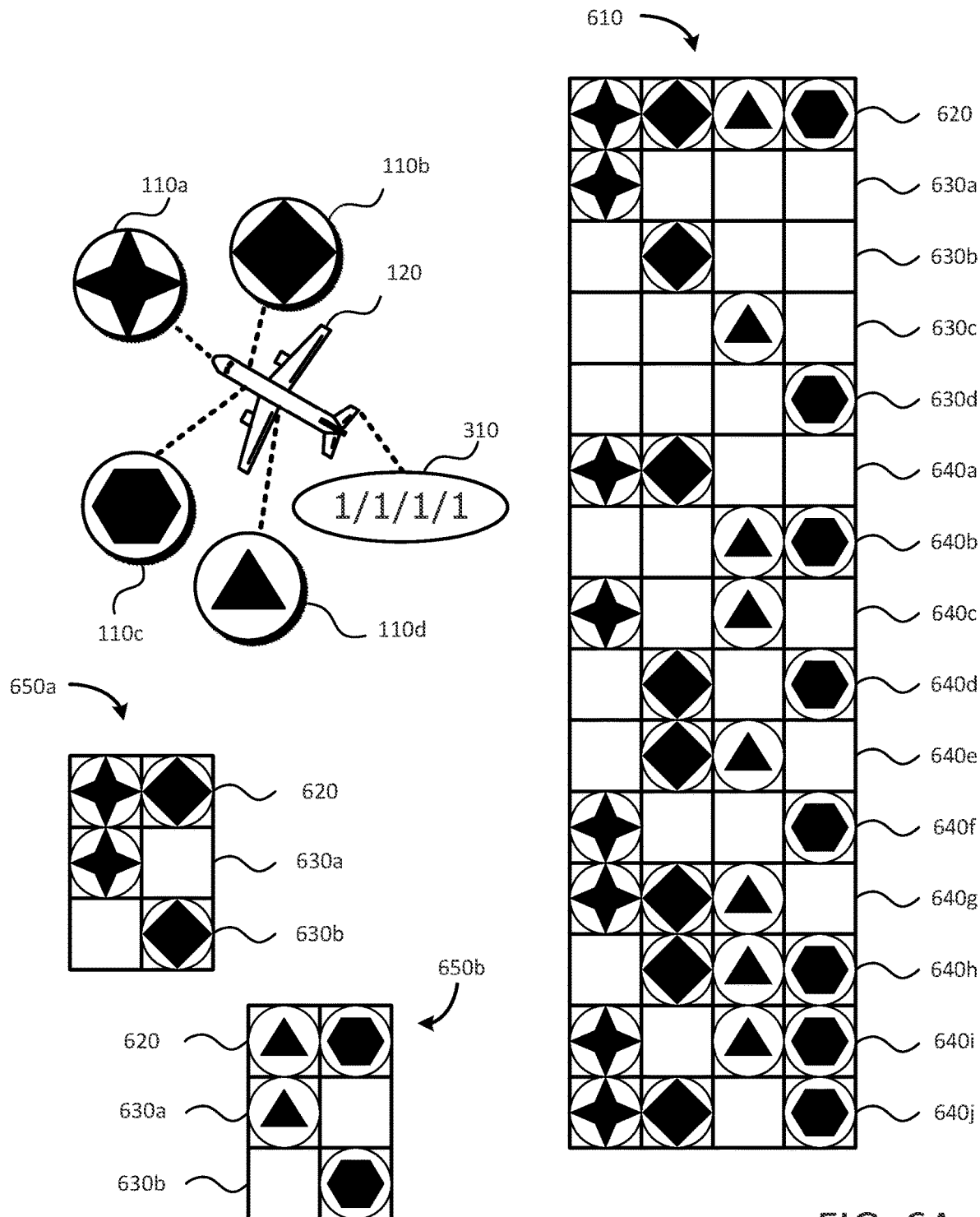
FIGS. 6A-6C illustrate candidate slice selection for use by the teaming optimizer, according to aspects of the present disclosure.
Figure 6B:
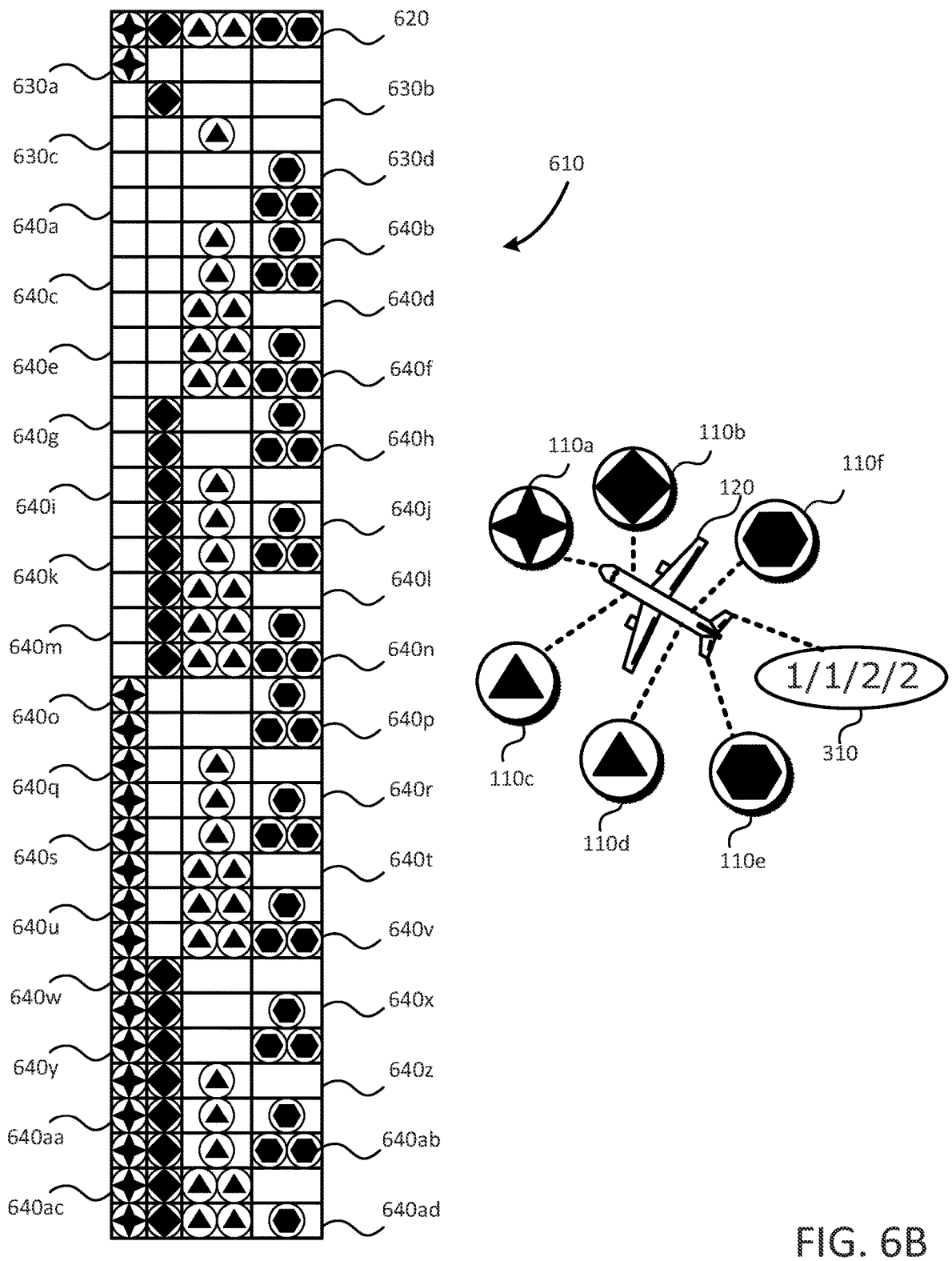
Figure 6C:
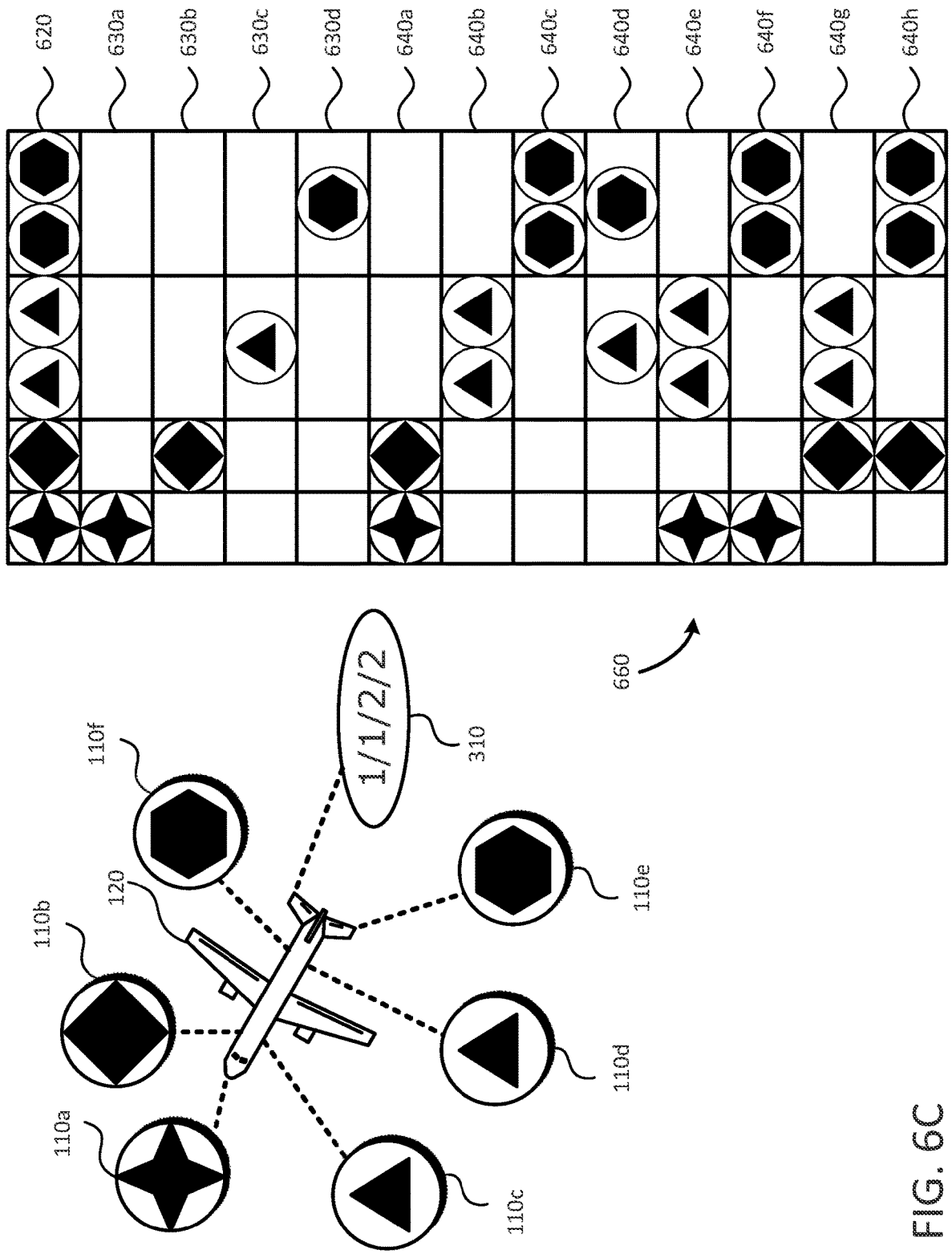

FIGS. 6A-6C illustrate candidate slice selection for use by the teaming optimizer, according to aspects of the present disclosure. To evaluate how to assign tasks to the duty charts 110a-d of the resource to result in resources being teamed to meet the resource requirements 310 of the various subtasks 120 of a set of tasks, the teaming optimizer divides the resources into slices for evaluation. As illustrated in the slice tables in FIGS. 6A-6C, the teaming optimizer divides the resource assignments into "slices" in which each resource is illustrated in a corresponding column so that combinations of resources can be seen in rows of the respective slice table. Depending on the computational priorities of the teaming optimizer, the slices selected for analysis (i.e., the "candidate" slices of the available slices) can include some or all of the available combinations of the resources.

In FIG. 6A an exhaustive slice table 610 corresponds to a subtask 120 with a resource requirement 310 for duty one of a first resource, one of a second resource, one of a third resource, and one of a fourth resource (e.g., a pilot, a co-pilot, a purser, and a flight attendant). The corresponding exhaustive slice table 610 is "exhaustive" because every potential combination of resources is included therein. A full-teaming slice 620 represents a combination of resources (e.g., 1/1/1/1) to meet the resource requirement 310 of the associated subtask 120, and includes four single-resource slices 630*a-d* (generally or collectively, single-resource slice 630) for the individual assignment of the corresponding resources (e.g., 1/0/0/0, 0/1/0/0, 0/0/1/0, and 0/0/0/1) for meeting segments of the resource requirement 310 of the associated subtask 120.

The remaining slices in the exhaustive slice table 610 are the partial-teaming slices 640*a-j*, where some teaming between the resources is enforced, but not enough to fully satisfy the resource requirements 310 of the subtask 120 without being combined with another partial-teaming slice 640 or one or more single-resource slices 630. For example, the first partial-teaming slice 640*a* can be combined with the second partial-teaming slice 640*b* (e.g., 1/1/0/0+0/0/1/1=1/1/1/1) or the third single-resource slice 630*c* and fourth single-resource slice 630*d* (e.g., 1/1/0/0+0/0/1/0+0/0/0/1=1/1/1/1) to meet the resource requirement 310. However, the second partial-teaming slice 640*b* cannot be combined with any other sets of slices, as doing so would result in a surplus in at least one resource.

Collectively, the full-teaming slice 620 and the partial-teaming slices 640 may be referred to as "pre-teamed slices" to define a pre-made team to be evaluated during resource assignment.

Additionally or alternatively to the exhaustive slice table 610, when the resources can be divided into classes, the teaming optimizer can use class-specific slice tables 650*a-b* (generally or collectively, class-specific slice table 650), where each class-specific slice table 650 represents combinations formed from resources of a single resource class. For example, if the first and second resources belong to a first class, and the third and fourth resources belong to a second class (e.g., a pilot and co-pilot as flight crew and a purser and flight attendant as cabin crew), a first class-specific slice table 620*a* can be formed for the first class, and a second class-specific slice table 620*b*. Similarly to the exhaustive slice table 610, each class-specific slice table 650 includes a full-teaming slice 620, the set of single-resource slices 630, and some or all of the partial-teaming slices 640 (if any) collected from the associated class of resources.

For example, a first class-specific slice table 650*a* can correspond to flight crew resources (e.g., a pilot and a co-pilot) while a second class-specific slice table 650*b* can correspond to cabin crew resources (e.g., a purser and a flight attendant), thus allowing the teaming optimizer to break down how to assign resources to tasks by individual resource classes. When using class-specific slice tables 650, the teaming optimizer performs a separate teaming analysis (such as described in relation to FIG. 7) for each class, but uses a smaller overall set of candidate slices for analysis (compare the six total slices from the first and second class-specific slice tables 650*a-b* to the fifteen slices from the exhaustive slice table 610 for the assignment of the same four resources). However, by separately evaluating the candidate slices for each class against respective teaming metrics, the teaming optimizer trades off analyzing a full-teaming assignment (e.g., the 1/1/1/1 assignment) and cross-class teaming assignments (e.g., 1/0/1/0) for an increased speed of analysis.

In FIG. 6B an exhaustive slice table 610 corresponds to a subtask 120 with a resource requirement 310 for duty one of a first resource, one of a second resource, two of a third resource, and two of a fourth resource (e.g., a pilot, a co-pilot, two pursers, and two flight attendants). The corresponding exhaustive slice table 610 includes thirty-five entries (rather than sixty-three) because the duty charts 110 are for the resource posting, and not the resource itself. Accordingly, when a subtask 120 includes several postings for the same resource (e.g., two pursers, two flight attendants, two GPUs), the actual resource assigned to a posting in interchangeable. For example, in the subtask 120 of FIG. 6B, whether Purser A is assigned to the third duty chart 110*c* and Purser B is assigned to the fourth duty chart 110*d* or vice versa is immaterial. Accordingly, an exhaustive slice table 610 does not need to include separate entries for "first resource of type A" and "second resource of type A", but rather includes teaming possibilities for "zero of resource of type A" "one of resource of type A", "two of resource for type A," etc.

For example, in FIG. 6B, the column representing postings for pursers (e.g., the third column including the triangle markers) can include zero postings (as in the row with the first single-resource slice 630*a*), two postings (to include both postings of the resource type as in the row with the second partial-teaming slice 640*b*) or one posting (to include one of the third duty chart 110*c* or the fourth duty chart 110*d* as in the row with third single-resource slice 630*c*). Accordingly, the exhaustive slice table 610 includes one full-teaming slice 620, four single-resource slices 630*a-d* (one corresponding to each resource type requested by the subtask 120), and thirty partial-teaming slices 640*a-ad*.

In FIG. 6C a curated slice table 660 corresponds to a subtask 120 with a resource requirement 310 for duty one of a first resource, one of a second resource, two of a third resource, and two of a fourth resource (e.g., a pilot, a co-pilot, two pursers, and two flight attendants), similarly to that shown in FIG. 6B. The corresponding curated slice table 660 is "curated" because a subset of the exhaustive potential combination of resources is selected for inclusion therein. The curated slice table 660 includes slices selected from the exhaustive set that include a full-teaming slice 620 that represents a combination of resources (e.g., 1/1/2/2) to meet the resource requirement 310 of the associated subtask 120, and some or all of the single-resource slices 630 for the associated subtask 120 and the partial-teaming slices 640.

In various aspects, the teaming optimizer uses a curated slice table 660 when the number of slices in an exhaustive slice table 610 or an individual class-specific slice table 650 exceeds a threshold number. The number of slices that the teaming optimizer includes in the curated slice table 660 is less than the threshold number, which accordingly reduces the computational complexity in analyzing a lower number of candidate slices, but prioritizes certain slices of interest. The curated slice table 660 shown in FIG. 6C includes thirteen entries, while an exhaustive slice table for the same number of duty charts 110*a-f* and associated resources for four different posting classes would contain thirty-five entries (e.g., as shown in FIG. 6B).

In various aspects, the total number of entries included in the curated slice table 660 may be equal to or less than the threshold number that triggers the teaming optimizer to use a curated slice table 660, and various rules can be used to include or exclude specific slices from the curated slice table 660. For example, as shown in FIG. 6C, the partial-teaming slices 640*a-h* include first through fourth partial-teaming slices 640*a-d* that pair the resources (e.g., 1/1/0/0, 0/0/2/0, 0/0/02, and 0/0/1/1), but exclude some pairings from the exhaustive slice table (e.g., 1,0,1,0 and 0,1,0,1). The curated partial-teaming slices 640 can include various team compositions selected by an operator as particularly important or useful to maintain across a task. Various rules used to select the slices to make up the curated slice table 660 can include the class or type of the resources (e.g., including slices for similar resources and resource classes before slices that include dissimilar resources), a number of resources to include in each slice (e.g., preferring even numbers over odd numbers), seniority or age of resources (e.g., preferring to group an older/more senior resource with a younger/more junior resource versus older resource together or younger resources together), how common a resource is in a pool of resources (e.g., pairing more common resources together versus teaming a less common resource with a more common resource), etc.

Figure 7:
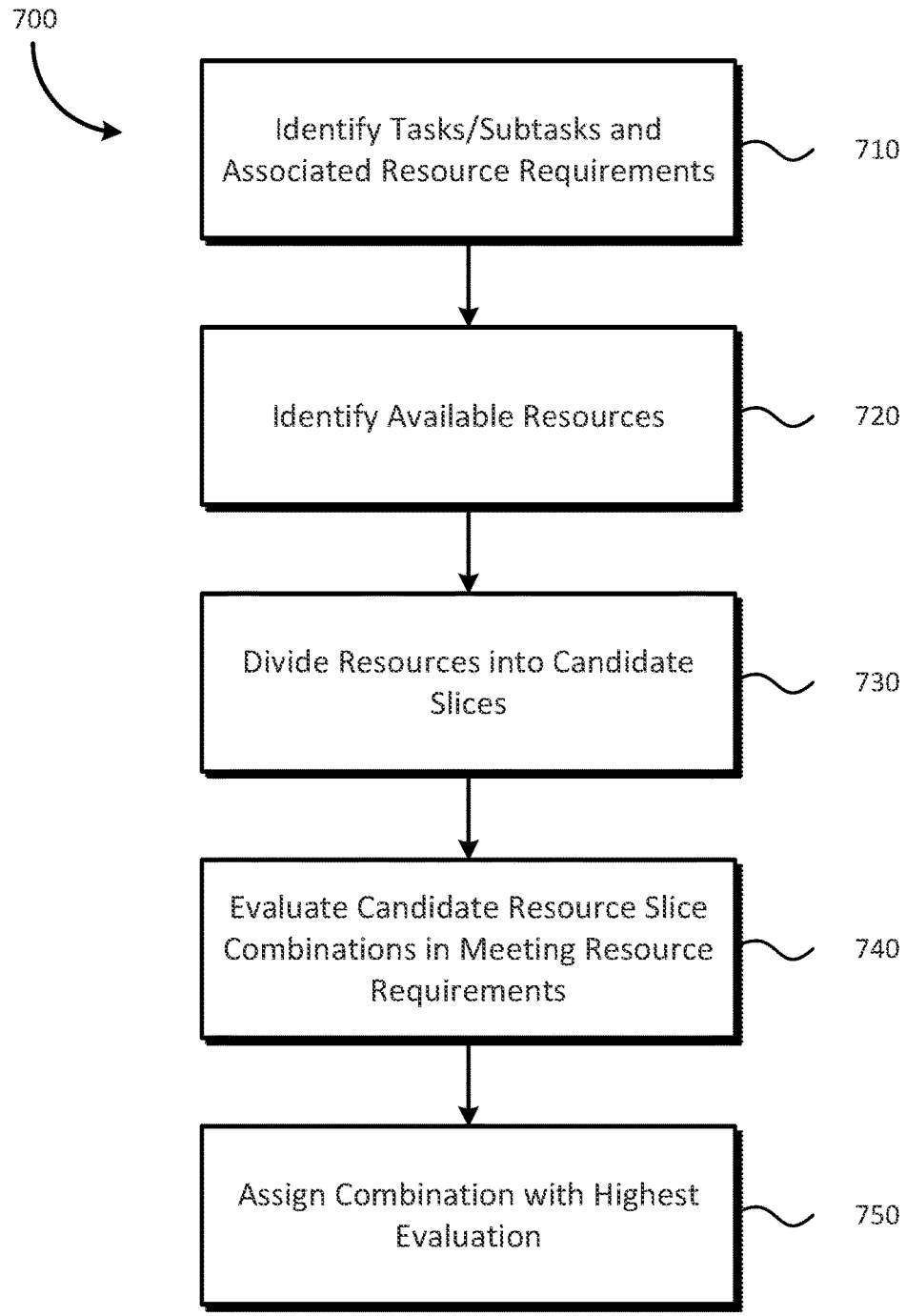
FIG. 7 is a flowchart of a method for teaming-prioritization in a teaming optimizer, according to aspects of the present disclosure.

FIG. 7 is a flowchart of a method 700 for teaming-prioritization in a teaming optimizer, according to aspects of the present disclosure. A teaming optimizer performs method 700 to provide a resource planning solution that prioritizes keeping "teams" of resources together through multiple subtasks that make up a task while respecting the various assignment rules and avoiding heavy expenditure of time or computing resources associated with combinational resource planning.

Method 700 begins at block 710, where the teaming optimizer identifies a set of tasks, made up of several subtasks, to which resources are to be assigned. In various aspects, each task of the set of tasks can include a different number of subtasks from one another, but includes a least an initial subtask that begins at an associated state and a final subtask that ends at the associated state. The associated states for each task of the set of tasks can vary between tasks such that a first task begins and ends at a first state, while a second task begins and ends at a second state. For example, a set of flight trips (as the tasks) can be divided into a plurality of flight legs (as the subtasks) that begin and end at various airports. A flight trip begins and ends at one airport (as the associated state) and requires various crew (as the resources) to staff those individual flight legs.

In various aspects, the teaming optimizer identifies the set of tasks from a task database that identifies the various subtasks that make up each task and the associated states for each subtask. In addition to subtasks, the various tasks may also include rest periods between various duty periods in the task. In some aspects, the teaming optimizer can consider all of the resources as "teamed" during such rest periods, while in other aspects, the teaming optimizer can evaluate the status of the resources during the rest periods to determine whether resources are teamed during the rest period (e.g., treating the rest period as a subtask). For example, when a rest period between two days of flight duty is included in a flight plan, the teaming optimizer can analyze the last flight leg of an initial duty period and a first flight leg of a subsequent duty period to determine if a pilot and a copilot (or other crew members) remain teamed over the rest period. In another example, the teaming optimizer may analyze whether both the pilot and copilot are assigned to the same hotel during the rest period and the last flight leg of an initial duty period and a first flight leg of a subsequent duty period to determine whether teaming is maintained over the rest period.

At block 720, the teaming optimizer identifies the resource requirements for each subtask of the plurality of subtasks included in the set of tasks. The teaming optimizer can identify the resource requirements from a rules database that indicates what resources are needed for a given subtask and how those resources can be used in and across various subtasks. The resource requirements may change between subtasks of a task or remain constant in various aspects. In various aspects, the resource requirements can be associated with various rules that vary between the different resources, which may affect how long a given resource is allowed to be in use, whether backups or redundant resources are required, whether a first resource can be substituted for a second resource, etc.

At block 730, the teaming optimizer divides a set of resources into a plurality of candidate slices to meet the resource requirements for the plurality of subtasks. In some aspects, the plurality of slices is an exhaustive set of potential combinations of resources across classes or specific individual classes. In various aspects, the plurality of slices is a curated set of potential combinations from multiple classes or specific individual classes. For example, the teaming optimizer can divide the set of resources based on resource classes to produce at least a first and a second class of candidate slices for separate analysis (per block 740) for each class of resources.

In another example, when the number of candidate slices exceeds a threshold number of slices, the teaming optimizer selects a number of candidate slices less than what the exhaustive number of candidate slices would be by selecting a curated set of slices. In some aspects, the teaming optimizer can generate a curated set of slices by selecting a number of slices from the exhaustive set so that the full-teaming slice and a priority-based subset of the other candidate slices (e.g., some or all of the single-resource slices 630 and partial-teaming slices 640 per FIGS. 6A-6C) that prioritizes various groups of resources to consider in a reduced-size set of slices (e.g., all of the single-resource slices 630, all paired partial-teaming slices 640, all partial-teaming slices 640 that include resource of type A, etc.).

At block 740, the teaming optimizer evaluates combinations of the candidate resource slices in meeting the resource requirements across the set of tasks. The teaming optimizer attempts various combinations of the candidate slices across the various tasks and subtasks and forms a plurality of different combinations that satisfy the resource requirements for the tasks. The teaming optimizer creates the combinations according to set of assignment rules for the resources so that any combination that violates a rule or does not fulfill the resource requirements is rejected (or not formed) by the teaming optimizer.

To evaluate each of the valid combinations against each other, the teaming optimizer assigns scores for various teaming situations across a given task. For example, the teaming optimizer can assign various penalties for assigning a resource to a task that does not begin or end at a state associated with the resource (e.g., assigning a pilot to begin or end a trip at an airport other than a base for that pilot). In another example, the teaming optimizer can assign bonuses (or mitigate penalties) for combinations that include teaming in an individual duty period or across a rest period, but not across an entire task. Additionally or alternatively, in some aspects, the teaming optimizer weights or scales the teaming metrics for a given task based on the number of resources assigned to the task, the number of subtasks in the task, a priority level for the task, or the like.

When evaluating the candidate resource slice combinations per block 740, the teaming optimizer analyzes the different combinations against one another to optimize the collective teaming metric across the set of tasks, rather than optimizing a given task. "Optimization", "optimize", "optimizing", and variants thereof, generally refer to a mathematical formulation of a problem to select some improvement (if an improvement is available) of some identified characteristic or constraint, and does not imply an absolute or global optimal improvement of the characteristic or constraint (as the term may be more colloquially used). Accordingly, in some situations, optimization may determine a minimum, where the minimum may be a local minimum for a given value rather than the global minimum for that value.

For example, a first resource assignment optimized for whole-task teaming across a set of three tasks may result in several combinations that result in all three tasks having whole-task teaming, two of the three tasks having whole-task teaming, only one of the three tasks having whole-task teaming, or none of the tasks having whole task teaming. Having a greater number of tasks with whole-task teaming displays optimization of the teaming metric relative to having a lower number of tasks with whole-task teaming. In various aspects, an optimized solution for whole-task teaming may not be possible across of tasks of the set, and the teaming optimizer therefore attempts to provide a solution with the greatest number of whole-task teaming assignments. In some aspects, other prioritization schemes can be used to differentiate between combinations with an equal measure of whole-tasks teaming, including partial-task teaming, preference-based assignments, etc.

In another example, a second resource assignment optimized for teaming and resource assignment preferences may demonstrate lower teaming scores than if optimized for only whole-task teaming and lower preference scores than if optimized only for resource assignment preferences, but demonstrates a higher combined whole-tasks teaming and resource preference score than the combined scores for other of the one-metric optimizations. Accordingly, an optimized design is created to improve the overall metric for one or more actively specified constraints and/or objectives, and may represent several layered design considerations in various priorities of optimization.

Accordingly, the teaming optimizer uses the teaming metric to optimize or otherwise prioritize combinations that result in a higher number of full teamed tasks over the set of tasks over combinations that result in lower numbers of teamed tasks, even when doing so may result in a given task having lower teaming.

At block 750, the teaming optimizer assigns the combination with the highest evaluation of the teaming metric for the set of tasks to the duty charts for the resources, which represents a resource assignment optimized for teaming across the set of tasks. In various aspects, the teaming analysis may be combined with further optimization according to different optimization criteria.

Figure 8:
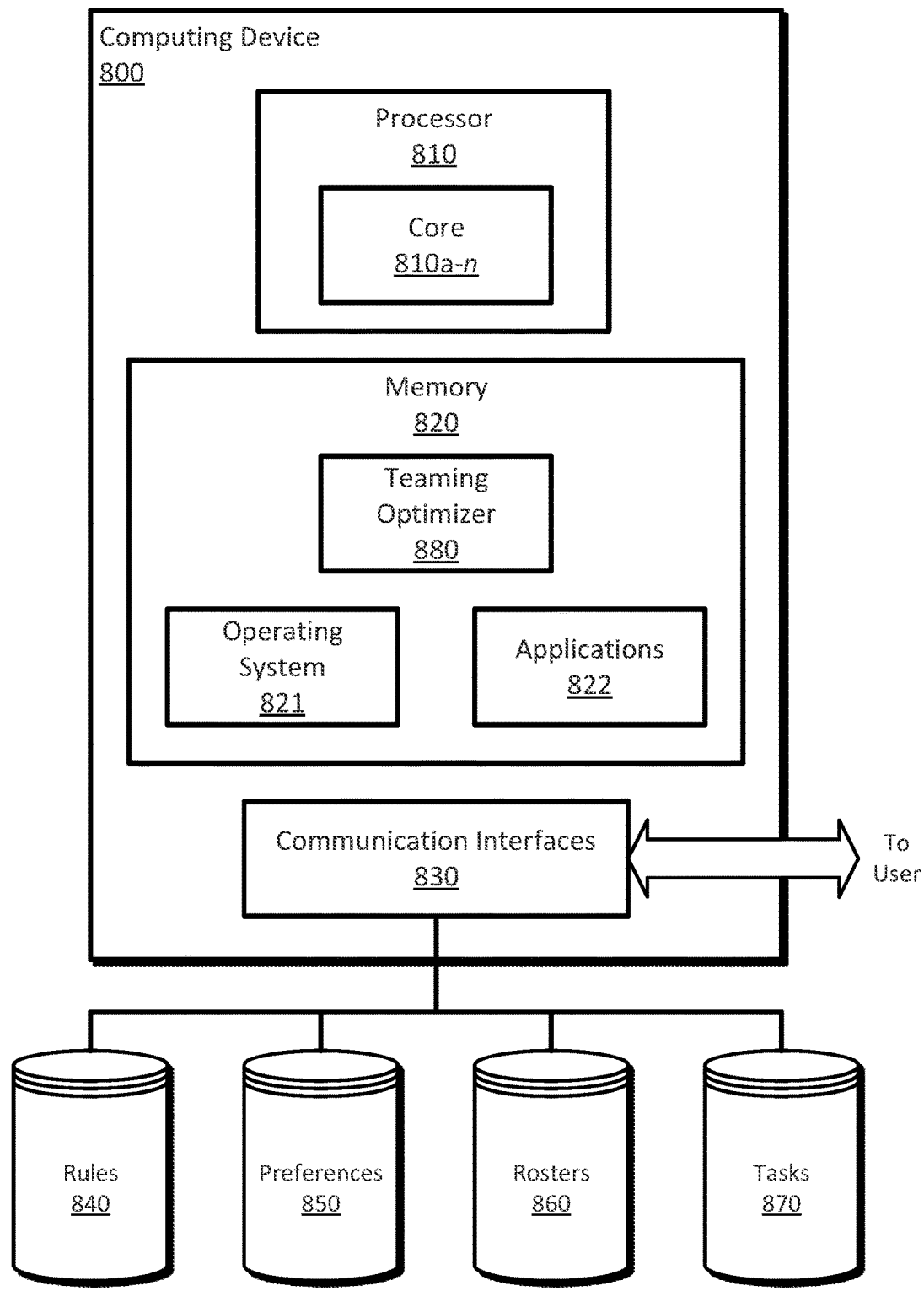
FIG. 8 illustrates a computing device, according to aspects of the present disclosure.

FIG. 8 illustrates a computing device, such as may be used to provide a teaming optimizer, according to aspects of the present disclosure. FIG. 8 illustrates example computing components of a computing device 800 or other processing system as may be used to provide a combinatorial optimizer described in the present disclosure.

The computing device 800 includes a processor 810, a memory 820, and an interface 830. The processor 810 and the memory 820 provide computing functionality to run various programs and/or operations for the respective computing device 800, including the storage and retrieval of the various data described herein and the operations of a teaming optimizer 880.

The processor 810, which may be any computer processor capable of performing the functions described herein, executes commands based on inputs received from a user and the data received from the interface 830. The data received from the interface 830 can include various data received for the teaming optimizer 880 from various databases related to the problem space (e.g., a rules database 840, a preferences database 850, a roster database 860 identifying the resources and associated base-states thereof, an a tasks database 870 identifying the tasks and subtasks having resource requirements to be met by the resources) and output to a user or other computing device for further analysis.

The interface 830 connects the computing device 800 to external devices, such as, for example, external memory devices, external computing devices, a power source, a wireless transmitter, etc., and may include various connection ports (e.g., Universal Serial Bus (USB), Firewire, Ethernet, coaxial jacks) and cabling. The interface 830 is used to send and receive between computing devices 800 and to communicate assignments to end users and to receive inputs therefrom.

The memory 820 is a memory storage device that generally includes various processor-executable instructions, that when executed by the processor 810, perform the various functions related to combinatorial optimization as discussed herein. The processor-executable instructions may generally be described or organized into various "applications" or "modules" in the memory 820, although alternate implementations may have different functions and/or combinations of functions. The memory 820 also generally includes data structures that store information for use by or output by the various applications or modules. In the present disclosure, the memory 820 includes at least instructions for an operating system 821 and one or more application(s) 822. The memory 820 may be one or more memory devices, such as, for example, Random Access Memory (RAM), Read Only Memory (ROM), flash memory, or any other type of volatile or non-volatile storage medium that includes instructions that the processor 810 may execute.

When the computing device 800 provides the functionality of the combinatorial optimizer described herein, the memory 820 includes processor executable instructions to provide the functionalities thereof described in the present disclosure. In some aspects, the memory 820 includes databases for locally caching data that include listings or databases that identify the resources, tasks, rule set, priority list, preferences, etc.

A further understanding of at least some of the aspects of the present disclosure is provided with reference to the following numbered Clauses, in which:

Clause 1: A method, comprising: identifying a set of tasks, wherein each task of the set of tasks includes a plurality of subtasks that includes an initial subtask starting at a given state and a final subtask returning to the given state; identifying resource requirements for each subtasks of the plurality of subtasks; dividing a set of resources into a plurality of candidate slices to meet resource requirements for the plurality of subtasks; forming a plurality of combinations from the plurality of candidate slices to satisfy the resource requirements; identifying a given combination from the plurality of combinations having a highest teaming metric across the set of tasks; and assigning the given combination for the set of tasks.

Clause 2: A method as is described in any of Clauses 1 and 3-10, wherein the teaming metric is configured to prioritize combinations that result in a higher number of tasks in the set of tasks exhibiting whole-task teaming over combinations that result in a lower numbers of tasks exhibiting whole-task teaming.

Clause 3: A method as is described in any of Clauses 1, 3, and 4-10, wherein the teaming metric is configured to penalize combinations in which a given resource assigned to the task of the set of tasks is not associated with the given state.

Clause 4: A method as is described in any of Clauses 1-3 and 5-10, wherein the set of resources is divided into at least a first class of candidate slices and a second class of candidate slices, further comprising: evaluating the first class of candidate slices and the second class of candidate slices against the teaming metric separately from one another.

Clause 5: A method as is described in any of Clauses 1-4 and 6-10, wherein a number of candidate slices for a given task is set less than an exhaustive number of candidate slices for the given task when the exhaustive number exceeds a threshold number.

Clause 6: A method as is described in any of Clauses 1-5 and 7-10, further comprising: selecting up to the threshold number of candidate slices from an exhaustive set of candidate slices to include: a priority-based subset of candidate slices from the exhaustive set of candidate slices.

Clause 7: A method as is described in any of Clauses 1-6 and 8-10, wherein a given task of the set of tasks includes associated subtasks that span a rest period that is considered teamed for all resources.

Clause 8: A method as is described in any of Clauses 1-7, 9, and 10, further comprising: generating the plurality of combinations according to a set of assignment rules for the resources.

Clause 9: A method as is described in any of Clauses 1-8 and 10, wherein: a first task of the set of tasks is associated with a first state as the given state; first resources assigned to the first task are associated with the first state; a second task of the set of tasks is associated with a second state as the given state that is different from the first state; and second resources assigned to the second task are associated with the second state.

Clause 10: A method as is described in any of Clauses 1-9, wherein: the set of tasks are flight trips; the plurality of subtasks are flight legs; the given state designates an airport; the resources identify crew postings to the flight legs; and the teaming metric is configured to optimize whole-task teaming across the set of tasks.

Clause 11: A system, comprising: a memory storing computer-executable instructions; and a processor configured to execute the computer-executable instructions and cause the system to perform a method in accordance with any one of Clauses 1-10.

Clause 12: A non-transitory computer-readable medium comprising computer-executable instructions that, when executed by a processor of a computing system, cause the computing system to perform a method in accordance with any one of Clauses 1-10.

Clause 13. A computer program product embodied on a computer readable storage medium comprising code for performing a method in accordance with any one of Clauses 1-10.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium(s) having computer readable program code embodied thereon.

Program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A method for reducing a memory usage and a power usage and improving a computational speed of a computing device forming a team of resources for completing a task, the method comprising:
    transforming the computing device to a special purpose computer by adding a teaming optimizer for assigning the team of resources to complete the task comprising: resource requirements, a plurality of subtasks, and rule sets, wherein the teaming optimizer prioritizes whole-task teaming completing the task with the team being formed from rosters of resources completing all the subtasks and preferring partial teaming over no teaming in completing the task;
    accessing through a communication interface, by the teaming optimizer, the task and the rosters of resources, wherein each resource comprises, respectively, a state;
    accessing through the communication interface, by the teaming optimizer, a resource requirement in the resource requirements for each subtask of the plurality of subtasks;
    formatting for each subtask respectively, by the teaming optimizer, a table comprising the resource requirements and a plurality of candidate slices comprising selections of resources from the rosters forming potential assignments forming every potential combination of the resources that satisfies the resource requirement;
    transforming the table by the teaming optimizer using the rule sets for assigning a class respectively for each of the resources and curating, using the rule sets, the plurality of candidate slices into curated slice tables comprising at least a first curated slice table comprising resources from a first class and a second curated slice table comprising resources from a second class;
    weighting evaluations of the first curated slice table and the second curated slice table separately from one another by the teaming optimizer using teaming metrics;
    identifying the team of resources from the curated slice tables having a highest total teaming metric that satisfies all the resource requirements and all the rule sets of the task; and
    assigning the combination of resources to complete the task.

2. The method of claim 1, further comprising the teaming metrics prioritizing cross period teaming in the team of resources.

3. The method of claim 1, further comprising each:
    resource of the team of resources changing the state of the resource respectively between a first subtask and the last subtask; and
    the rule sets prioritizing each resource of the team of resources completing the task in a same state that the resource began the task.

4. The method of claim 1, further comprising the teaming optimizer prioritizing in-class teaming over cross-class teaming.

5. The method of claim 1, wherein the team of resources comprises a lowest possible number of resources that satisfy all the resource requirements for the task.

6. The method of claim 5, further comprising the rosters of resources comprising cores of computer processors.

7. The method of claim 6, further comprising evening a heating/cooling cycle of the computing device.

8. The method of claim 1, wherein the resource requirements differ among the subtasks of the task.

9. The method of claim 1, wherein a state of each resource of the team of resources differs during a subtask of a rest period from the state of each resource during a first subtask.

10. The method of claim 1, wherein:
    the subtasks comprise handling individual threads of a load on a processor; and
    the teaming metrics comprise cumulative penalties and bonuses.

11. A system configured to reduce a memory usage and a power consumption and increase a computational speed by a computing device, wherein the system comprises:
    a memory that comprises computer-executable instructions; and
    a processor configured to execute the computer-executable instructions and cause the system to perform a method comprising:
        transforming the computing device to a special purpose computer by adding a teaming optimizer to the computing device assigning a team of resources to complete a task comprising: resource requirements, a plurality of subtasks, and rule sets, wherein the teaming optimizer prioritizes whole-task teaming completing the task with the team being formed from rosters of resources completing all the subtasks and preferring partial teaming over no teaming in completing the task;
        accessing through a communication interface, by the teaming optimizer, the task and the rosters of resources, wherein each resource comprises, respectively, a state;

accessing through the communication interface, by the teaming optimizer, a resource requirement in the resource requirements for each subtask of the plurality of subtasks;

formatting for each subtask respectively, by the teaming optimizer, a table comprising the resource requirements and a plurality of candidate slices comprising selections of resources from the rosters forming potential assignments forming every potential combination of the resources that satisfies the resource requirement;

transforming the table by the teaming optimizer using the rule sets for assigning a class respectively for each of the resources and curating, using the rule sets, the plurality of candidate slices into curated slice tables comprising at least a first curated slice table comprising resources from a first class and a second curated slice table comprising resources from a second class;

weighting evaluations of the first curated slice table and the second curated slice table separately from one another by the teaming optimizer using teaming metrics;

identifying the team of resources from the curated slice tables having a highest total teaming metric that satisfies all the resource requirements and all the rule sets of the task; and assigning the combination of resources to complete the task.

12. The system of claim 11, wherein the teaming metrics are configured to prioritize cross period teaming in the team of resources.

13. The system of claim 11, further comprising:
each resource of the team of resources changing the state of the resource respectively between a first subtask and the last subtask; and
the rule sets prioritizing each resource of the team of resources completing the task in a same state that the resource began the task.

14. The system of claim 11, further comprising the teaming optimizer prioritizing in-class teaming over cross-class teaming.

15. The system of claim 11, wherein the team of resources comprises a lowest possible number of resources that satisfy all the resource requirements for the task.

16. The system of claim 11, further comprising a rest period being a subtask.

17. The system of claim 11, wherein the rosters comprise cores of computer processors.

18. The system of claim 11, wherein a state of each resource of the team of resources differs during a subtask of a rest period from the state of each resource during a first subtask.

19. The system of claim 11, wherein:
the subtasks comprise handling individual threads of a load on a processor; and
the teaming metrics comprise cumulative penalties and bonuses.

20. A non-transitory computer-readable medium that comprises computer-executable instructions configured to improve a computational speed of a computing device and to perform a method that comprises:

transforming the computing device to a special purpose computer by adding a teaming optimizer to the computing device configured to assign a team of resources to complete a task that comprises: resource requirements, a plurality of subtasks, and rule sets, wherein the teaming optimizer is configured to create whole-task teaming completing the task with a team formed from rosters of resources that completes all the subtasks and prefers partial teaming over no teaming in completing the task;

accessing through a communication interface, by the teaming optimizer, the task and the rosters of resources, wherein each resource comprises, respectively, a state;

accessing through the communication interface, by the teaming optimizer, a resource requirement in the resource requirements for each subtask of the plurality of subtasks;

formatting for each subtask respectively, by the teaming optimizer, a table comprising the resource requirements and a plurality of candidate slices comprising selections of resources from the rosters forming potential assignments forming every potential combination of the resources that satisfies the resource requirement;

transforming the table by the teaming optimizer using the rule sets for assigning a class respectively for each of the resources and curating, using the rule sets, the plurality of candidate slices into curated slice tables comprising at least a first curated slice table comprising resources from a first class and a second curated slice table comprising resources from a second class;

weighting evaluations of the first curated slice table and the second curated slice table separately from one another by the teaming optimizer using teaming metrics;

identifying the team of resources from the curated slice tables having a highest total teaming metric that satisfies all the resource requirements and all the rule sets of the task; and assigning the combination of resources to complete the task.

* * * * *